US00RE42266E

(19) United States
(12) Reissued Patent
Sparrowhawk

(10) Patent Number: US RE42,266 E
(45) Date of Reissued Patent: Apr. 5, 2011

(54) DISCONTINUOUS CABLE SHIELD SYSTEM AND METHOD

(75) Inventor: Bryan Sparrowhawk, Monroe, WA (US)

(73) Assignee: Leviton Manufacturing Co., Inc., Little Neck, NY (US)

(21) Appl. No.: 12/707,985

(22) Filed: Feb. 18, 2010

Related U.S. Patent Documents

Reissue of:
(64) Patent No.: 7,332,676
Issued: Feb. 19, 2008
Appl. No.: 11/277,744
Filed: Mar. 28, 2006

U.S. Applications:
(60) Provisional application No. 60/665,969, filed on Mar. 28, 2005.

(51) Int. Cl.
*H01B 7/18* (2006.01)

(52) U.S. Cl. ..... 174/102 R; 174/102 SP

(58) Field of Classification Search ..... 174/36, 174/102 R, 102 SP, 112
See application file for complete search history.

(56) References Cited

U.S. PATENT DOCUMENTS

| | | | | | |
|---|---|---|---|---|---|
| 1,959,339 | A | * | 5/1934 | Bennet | 174/26 R |
| 2,796,463 | A | | 6/1957 | Mallinekrodt | |
| 3,573,676 | A | | 4/1971 | Mayer | |
| 3,896,380 | A | * | 7/1975 | Martin | 455/523 |
| 4,129,841 | A | * | 12/1978 | Hildebrand et al. | 333/237 |
| 4,339,733 | A | * | 7/1982 | Smith | 333/237 |
| 4,743,725 | A | * | 5/1988 | Risman | 219/691 |
| 4,788,088 | A | | 11/1988 | Kohl | |
| 5,465,395 | A | * | 11/1995 | Bartram | 455/523 |
| 5,473,336 | A | * | 12/1995 | Harman et al. | 343/790 |
| 6,207,901 | B1 | * | 3/2001 | Smith et al. | 174/102 R |
| 6,998,537 | B2 | | 2/2006 | Clark et al. | |
| 7,335,837 | B2 | | 2/2008 | Pfeiler et al. | |
| 2006/0048961 | A1 | | 3/2006 | Pfeiler et al. | |
| 2006/0048964 | A1 | | 3/2006 | Rick | |

* cited by examiner

*Primary Examiner*—William H Mayo, III
(74) *Attorney, Agent, or Firm*—Nixon & Vanderhye PC

(57) ABSTRACT

Implementations of a discontinuous cable shield system and method include a shield having a multitude of separated shield segments dispersed along a length of a cable. The separated shield segments can serve as an incomplete, patch-worked, discontinuous, 'granulated' or otherwise perforated shield for differential transmission lines such as with twisted wire pairs.

53 Claims, 24 Drawing Sheets

DISCONTINUOUS CABLE SHIELD SYSTEM AND METHOD

Matter enclosed in heavy brackets [ ] appears in the original patent but forms no part of this reissue specification; matter printed in italics indicates the additions made by reissue.

CROSS REFERENCE TO RELATED APPLICATION

This application claims priority benefit of provisional application Ser. No. 60/665,969 filed Mar. 28, 2005.

BACKGROUND OF THE INVENTION

1. Field of the Invention

The present invention is generally related to cable for transmitting signals, and more particularly related to reduction of crosstalk experienced between the signals.

2. Description of the Related Art

A metal based signal cable for transmitting information across computer networks, generally have a plurality of wire pairs (such as pairs of copper wires) so that a plurality of signals, each signal using a separate wire pair, can be transmitted over the cable at any given time. Having many wire pairs in a cable can have advantages, such as increased data capacity, but as signal frequency used for the signals is increased to also increase data capacity, a disadvantage becomes more evident. As signal frequency increases, the individual signals tend to increasingly interfere with one another due to crosstalk due to the close proximity of the wire pairs. Twisting the two wires of each pair with each other helps considerably to reduce crosstalk, but is not sufficient as signal frequency increases.

Other conventional approaches can be also used to help reduce crosstalk such as using physical spacing within the cable to physically separate and isolate the individual twisted wire pairs from one another to a certain degree. Drawbacks from using additional physical spacing include increasing cable diameter and decreasing cable flexibility.

Another conventional approach is to shield the twisted pairs as represented by the shield twisted pair cable 10 depicted in FIG. 1 as having an internal sheath 12 covered by insulation 14 (such as Mylar), and covered by a conductive shield 16. A drain wire 18 is electrically coupled to the conductive shield 16. The conductive shield 16 can be used to a certain degree to reduce crosstalk by reducing electrostatic and magnetic coupling between twisted wire pairs 20 contained within the internal sheath 12.

An external sheath 22 covers the conductive shield 16 and the drain wire 18. The conductive shield 16 is typically connected to a connector shell (not shown) on each cable end usually through use of the drain wire 18. Connecting the conductive shield 16 to the connector shell can be problematic due to additional complexity of installation, added cable stiffness, special connectors required, and the necessity for an electrical ground, available at both ends of the cable 10. Furthermore, improper connection of the conductive shield 16 can reduce or eliminate the effectiveness of the conductive shield and also can raise safely issues dye to improper grounding of the drain wire 18. In some improper installations, the conventional continuous shielding of a cable segment is not connected on one or both ends. Unconnected ends of conventional shielding can give rise to undesired resonances related to the un-terminated shield length which enhances undesired external interference and crosstalk at those resonant frequencies Although conventional approaches have been adequate for reducing crosstalk for signals having lower frequencies, unfortunately, crosstalk remains a problem for signals having higher frequencies.

BRIEF DESCRIPTION OF THE SEVERAL VIEWS OF THE DRAWING(S)

DETAILED DESCRIPTION OF THE INVENTION

As discussed herein, implementations of a discontinuous cable shield system and method include a shield having a multitude of separated shield segments dispersed along a length of a cable to reduce crosstalk between signals being transmitted an twisted wire pairs of a cable. Implementations include a cable comprising a plurality of differential transmission lines extending along a longitudinal direction for a cable length, and a plurality of conductive shield segments, each shield segment extending longitudinally along a portion of the cable length, each shield segment being in electrical isolation from all other of the plurality of shield segments, and each shield segment at least partially extending about the plurality of the differential transmission lines.

Figure 1:
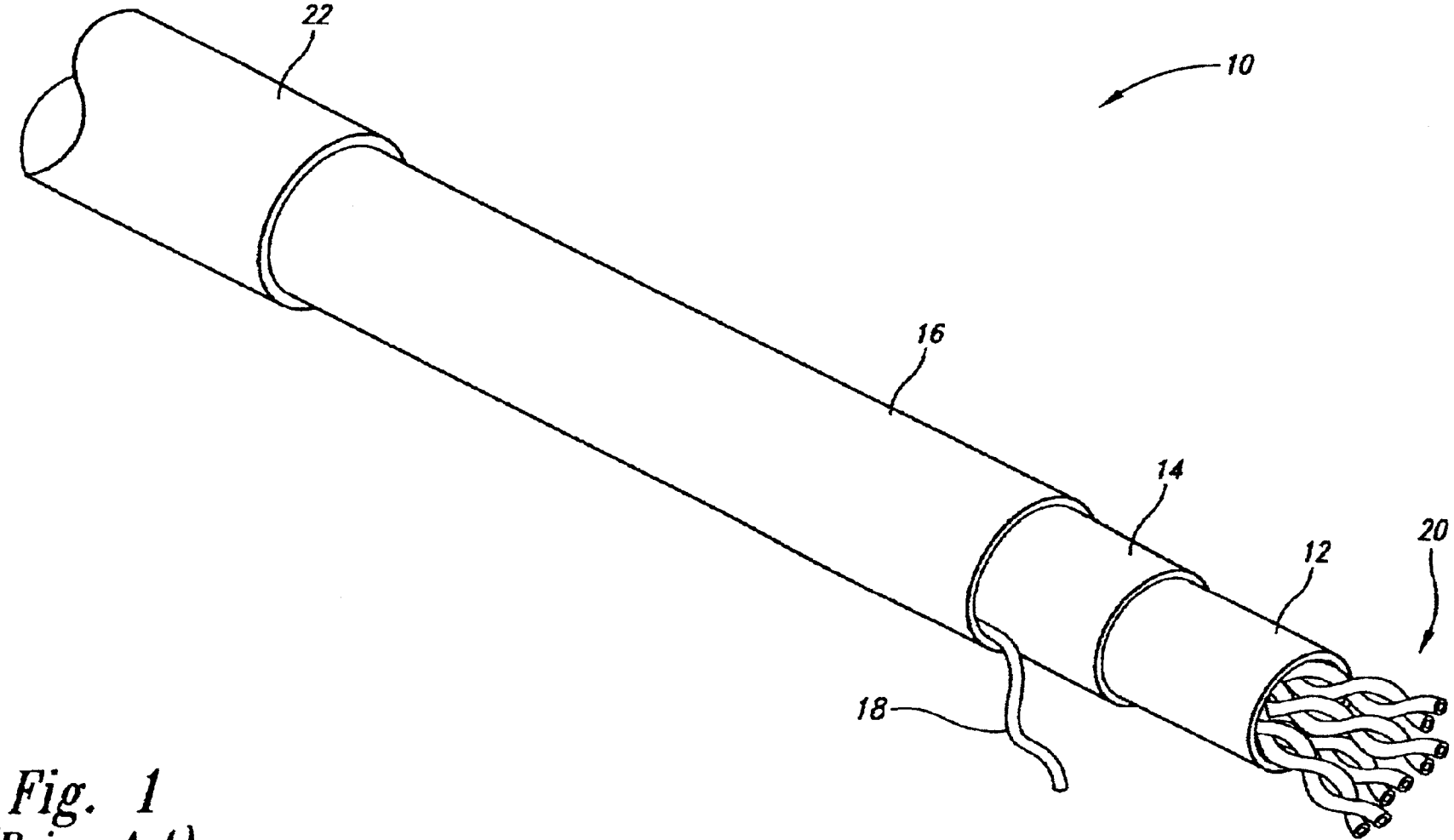
Fig. 1 (Prior Art)
FIG. 1 is an isometric view of a conventional cable shield system.
Figure 2:
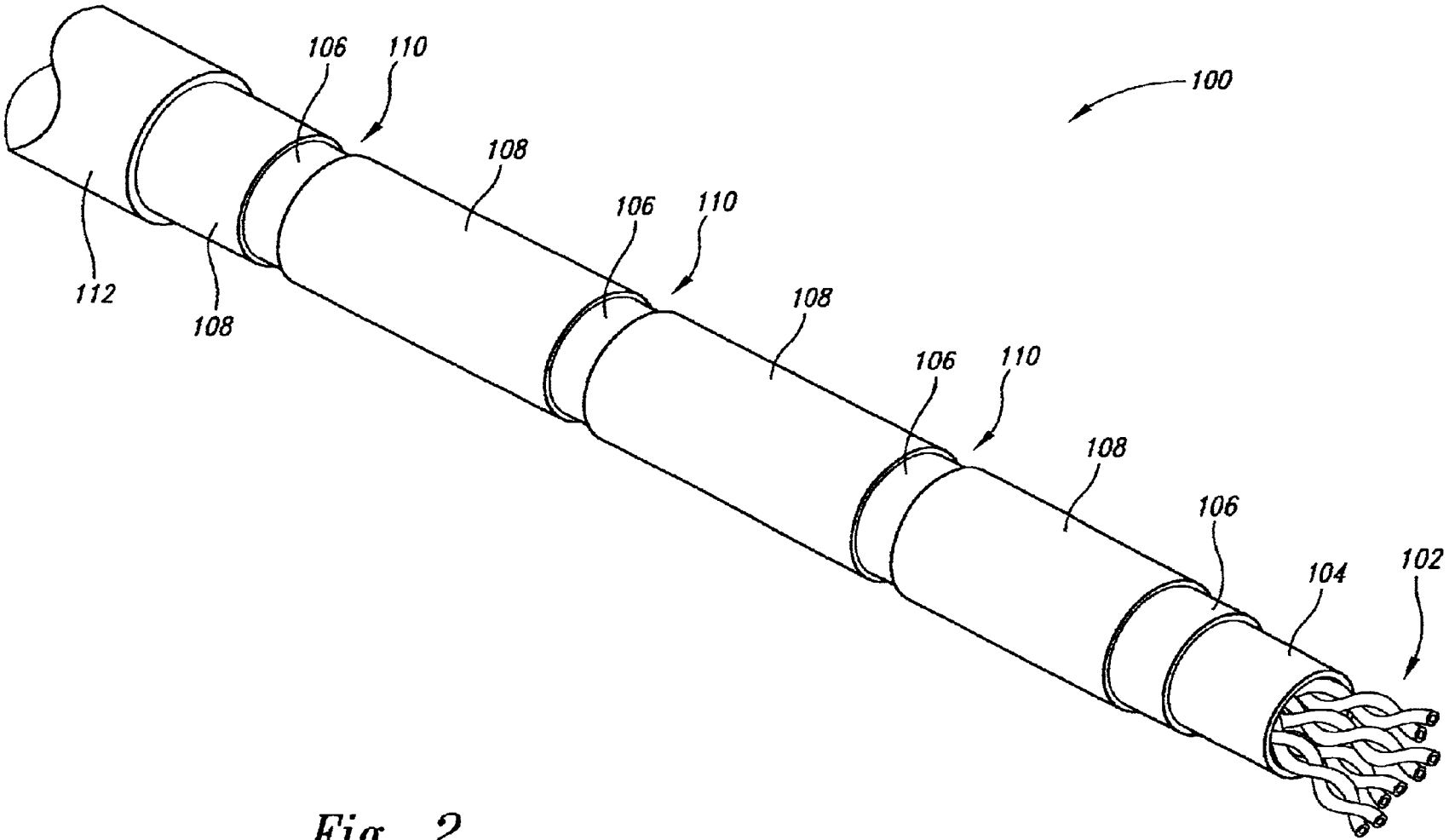
FIG. 2 is an isometric view of a first implementation of a discontinuous cable shield system.
Figure 3:
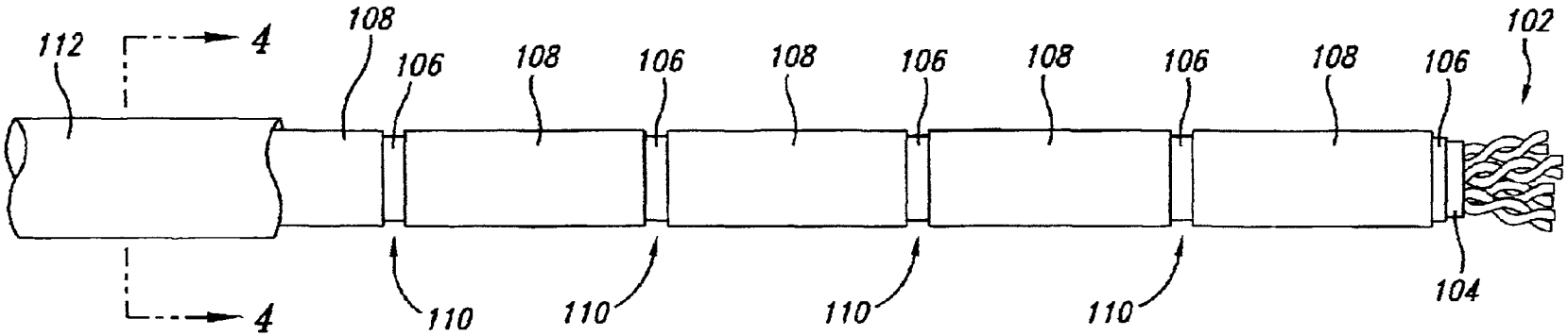
FIG. 3 is a side elevational view of the first implementation of FIG. 2.
Figure 4:
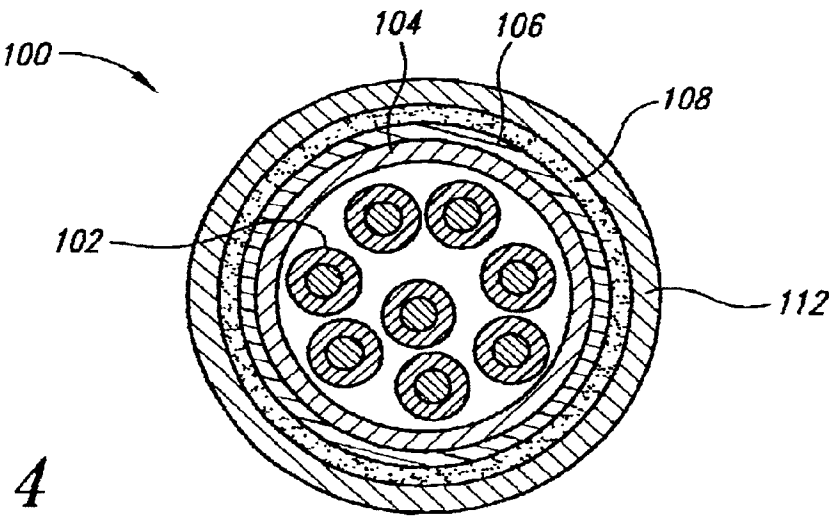
FIG. 4 is a cross sectional view of the first implementation of FIG. 2.

A first implementation 100 of the discontinuous cable shield system is shown in FIG. 2, FIG. 3, and FIG. 4 as having a plurality of twisted wire pairs 102 contained by an inner cable sheath 104 and covered by insulation 106 (such as a Mylar layer). The insulation 106 is covered by shield segments 108 physically separated from one another by segmentation gaps 110 between the adjacent shield segments. An outer cable sheath 112 covers the separated shield segments 108 and portions of the insulation 106 exposed by the segmentation gaps 110. The first implementation 100 has approximately equal longitudinal lengths and radial thickness for the separated shield segments 108 and approximately equal longitudinal lengths for the segmentation gaps 110. In the first implementation, each of the segmentation gaps 110 have constant longitudinal length for each position around the cable circumference so that the separated shield segments 108 have squared ends.

The separated shield segments 108 serve as an incomplete, patch-worked, discontinuous, 'granulated' or otherwise perforated shield that has effectiveness when applied as shielding within the near-field zone around differential transmission lines such as the twisted wire pairs 102. This shield 'granulation' may have advantage in safety over a long-continuous un-grounded conventional shield, since it would block a fault emanating from a distance along the cable.

Various shapes, overlapping and gaps of the separated shield segments 108 may have useful benefit, possibly coupling mode suppression or enhancement, fault interruption (fusing), and attractive patterns/logos. In some implementations, a dimensional limit of shielding usefulness may be related to the greater of twist rate pitch or differential pair spacing of the twisted wire pairs 102 since the shielding tends to average the positive and negative electrostatic near-field emissions from the twisted wire pairs. Magnetic emissions may be averaged in another manner; only partially blocked by eddy currents countering the emitted near field related to each of the twisted wire pairs 102.

Implementations serve to avoid or reduce external field interference with inner-cable circuits, channels, or transmission lines. Reciprocity can apply to emissions avoidance as well. Implementations allow for installation without having to consider a shield when terminating differential cable pairs. Safety standards usually require safe grounding or insulation of such large conductive parts, however this is often ignored in actuality so the implementations may have a practical safety benefit. Implementations may also help to avoid negative effects of ground loops, such as associated with spark gaps in conventional cable shields for purpose of isolating all but transients.

Implementations involve differential transmissions lines, such as the twisted wire pairs 102. The twisted wire pairs 102 can be typically balanced having an equal and opposite signal on each wire. Use of twisted (balanced) pairs of wires mitigates loss of geometric co-axiality that results in radiation, particularly near-field radiation. Implementations serve to lessen crosstalk, such as unwanted communications and other interference by electrostatic, magnetic or electromagnetic means between closely routed pairs. Crosstalk can include alien crosstalk between separately sheathed wires.

Some implementations address requirements under TIA/EIA Commercial Building Telecommunications Cabling Standards such as those applied to balanced twisted pair cable including Category 5, 5e, 6 and augmented 6. Other implementations address other standards or requirements. Some implementations can serve to modify unshielded twisted pair cable having an outer insulating jacket covering usually four pairs of unshielded twisted wire pairs. Modifications can include converting to a form of shielded twisted pair cable having a single shield encompassing all four pairs under an outer insulating sheath. Some effects involved with implementations involve near field that is typically at less than sub-wavelength measurement radii where the angular radiation pattern from a source significantly varies from that at infinite radius.

Crosstalk between the various twisted wire pairs 102 and other interference originating from outside of the cable can be reduced to various degrees based upon size and shape of the separated shield segments 108. For instance, a more irregular pattern for the segmentation gaps 110 can assist in reduction of alien crosstalk and other interference whereas a more regular and aligned patterns for the segmentation gaps may be less effective in reducing alien crosstalk.

Use of the separated shield segments 108 can help to protect from crosstalk and other interference originating both internally and externally to the cable. This electromagnetic based crosstalk and other interference can be further reduced by use of irregular patterns for the segmentation gaps 110 so that the separated shield segments 108 are sized differently and consequently do not interact the same way with the same electromagnetic frequencies. Varying how the separated shield segments 108 interact with various electromagnetic frequencies helps to avoid having a particular electromagnetic frequency that somehow resonates with a majority of the separated shield segments to cause crosstalk associated with the resonant electromagnetic frequency.

The separated shield segments 108 can also be sized so that any potential resonant frequency is far higher than the operational frequencies used for signals being transmitted by the twisted wire pairs 132. Additionally a combination of small size or randomized size and irregular shape for the separated shield segments 108 could further offset tendencies for resonant frequencies or at least offset a tendency for a predominant resonant frequency to cause crosstalk. Some of the separated shield segments 108 could also be made of various compositions of conductive and resistive materials to vary how the separated shield segments interact with potentially interfering electromagnetic waves.

Short lengths of the separated shield segments 108 can move related resonances to higher frequencies, above the highest frequency of interest as used for cable data signaling. Selection of optimal length, shape and material loss factors related to the separated shield segments 108 and possible materials in the insulation 106 or otherwise between the separated shield segments in the segmented gaps 110 can serve to eliminate need for termination of a shielding and can provide enhanced shielding aspects. Consequential interruption of ground loops, such as undesired shield currents and noise caused by differences in potential at conventional grounding points at the ends of the cable can avoid introduction of interference onto the twisted wire pairs 102 that would otherwise be emanating from noise induced by conventional shield ground loop current. As mentioned elsewhere, higher resonances can be mitigated, softened, dulled, and de-Q'ed by shaping the separated shield segments 108 and in some implementations by adding electrically lossy medium surrounding or within the separated shield segments.

For instance, a resistive lossy component could be added to the segmentation gaps 110 to dissipate energy that would otherwise cause crosstalk. Further variations to the separated shield segments 108 could include incorporating slits into the separated shield segments. Also, the separated shield segments 108 could vary in thickness amongst one another or individual separated shield segments could have irregular thickness to further help offset tendencies for frequency resonance and resultant crosstalk.

Further implementations can position between layers of the insulation 106 other layers of various shapes of the separated shield segments 108. In these layered implementations, portions of some of the separated shield segments 108 could be positioned on top of portions of other of the separated shield segments to vary in another dimension how the separated shield segments are effectively shaped and sized.

The separated shield segments 108 can also allow for enhanced cable flexibility depending in part on how the segmentation gaps 110 are shaped. Furthermore, the implementations need not include a drain wire so can also avoid associated issues with such. Some implementations can further include use of conventional separators to physically separate each of the twist wire pairs 102 from one another as discussed above in addition to using the separated shield segments 108. Other variations can include having the separated shield segments 108 positioned directly upon the twisted wire pairs 102 or on the outer cable sheath 112.

The separated shield segments 108 can be formed by various methods including use of adhesive on foil, foil applied to a heated plastic sheath such as immediately after extrusion of the plastic sheath, molten metalized spray upon masking elements, molten metalized spray on irregular surfaces whereupon excessive metal in raised areas are subsequently removed, use of conductive ink deposited by controlled jet or by pad transfer process.

Figure 5:
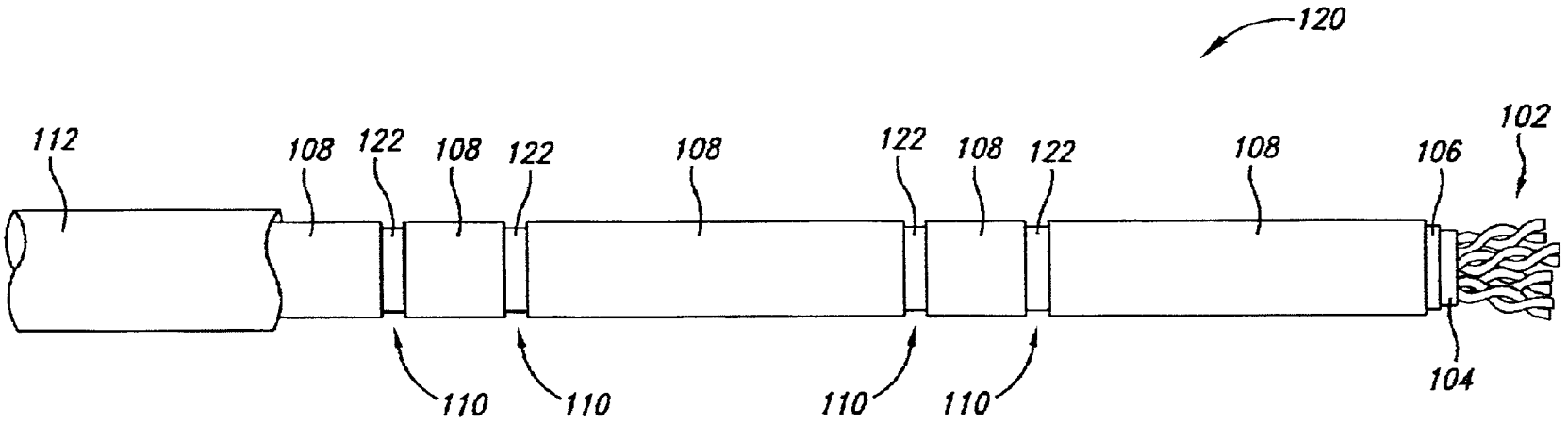
FIG. 5 is a side elevational view of a second implementation of the discontinuous cable shield system.

A second implementation 120 of the discontinuous cable shield system is shown in FIG. 5 as having different longitudinal lengths for the separated shield segments 108 with segments having short longitudinal length positioned between segments having longer longitudinal length. The second implementation also includes lossy material 122 covering those portions of the insulation 106 aligned with the segmentation gaps 110 that are not covered by the separated shield segments 108. The lossy material 122 acts as a dissipative factor to reduce possibilities of crosstalk or other interference due to resonance as discussed above.

Figure 6:
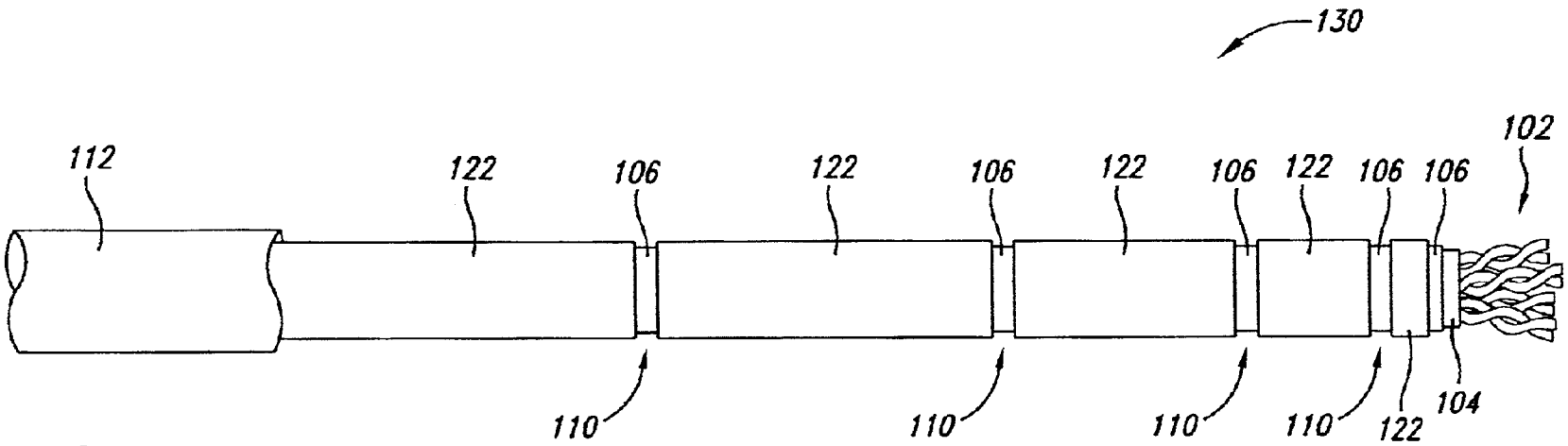
FIG. 6 is a side elevational view of a third implementation of the discontinuous cable shield system.

A third implementation 130 of the discontinuous cable shield system is shown in FIG. 6 as having different longitudinal lengths for the lossy material 122 separated by segmentation gaps 110 and becoming progressively shorter along a longitudinal direction.

Figure 7:
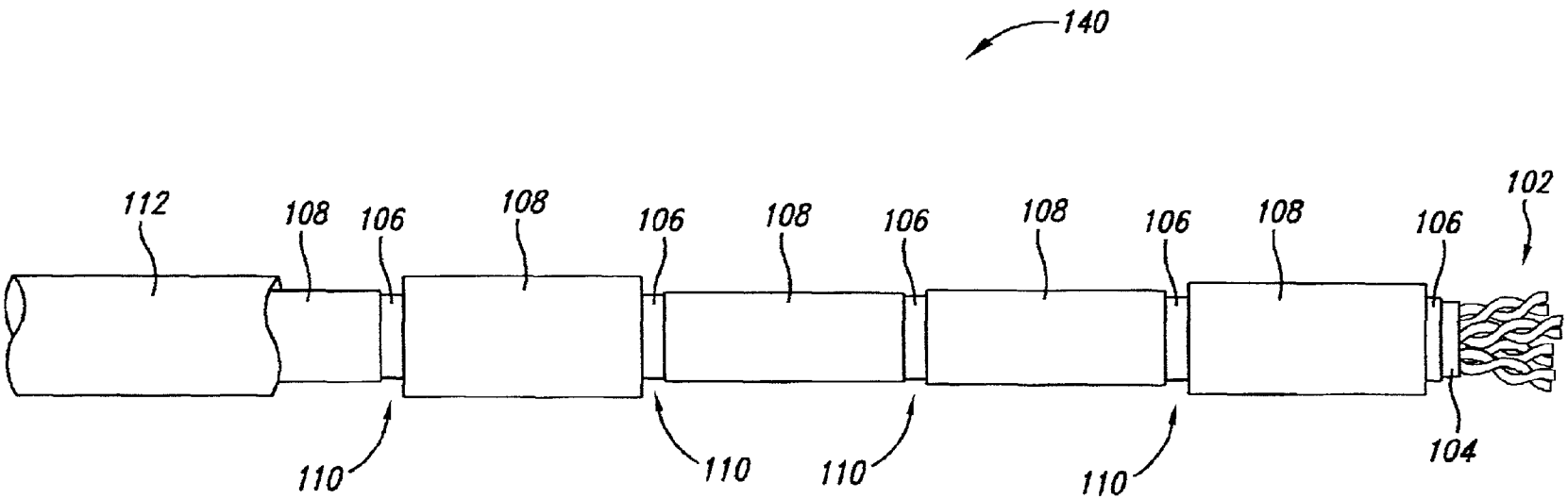
FIG. 7 is a side elevational view of a fourth implementation of the discontinuous cable shield system.

A fourth implementation 140 of the discontinuous cable shield system is shown in FIG. 7 as having different radial thickness for the separated shield segments 108 with segments becoming progressively shorter along a longitudinal direction.

Figure 8:
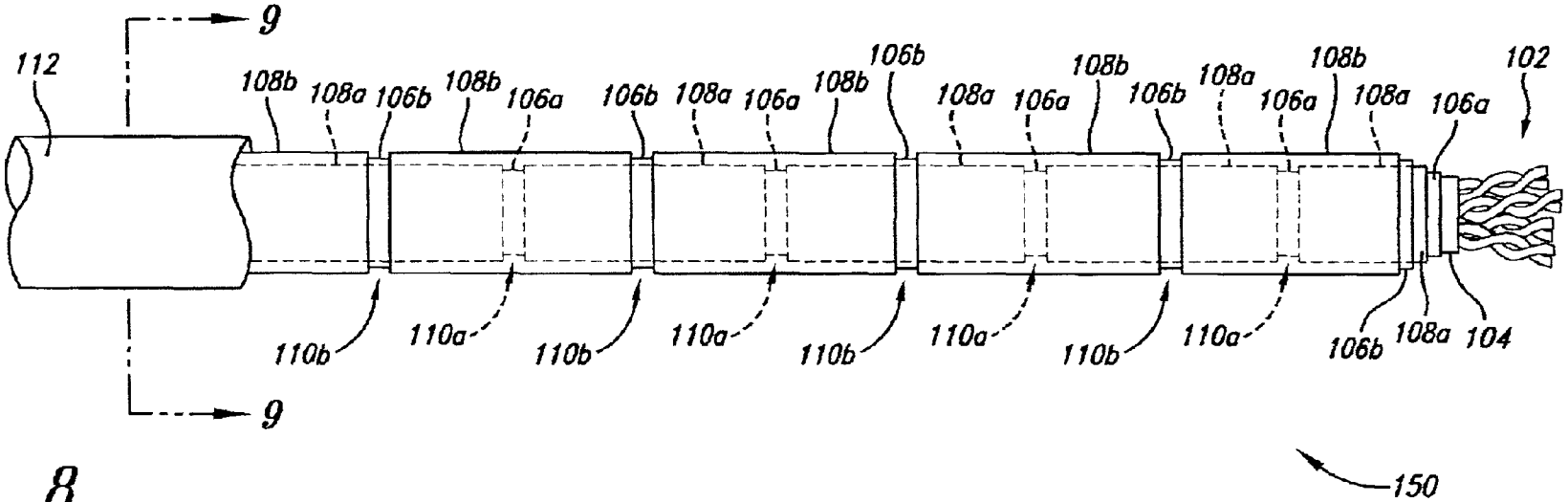
FIG. 8 is a side elevational view of a fifth implementation of the discontinuous cable shield system.
Figure 9:
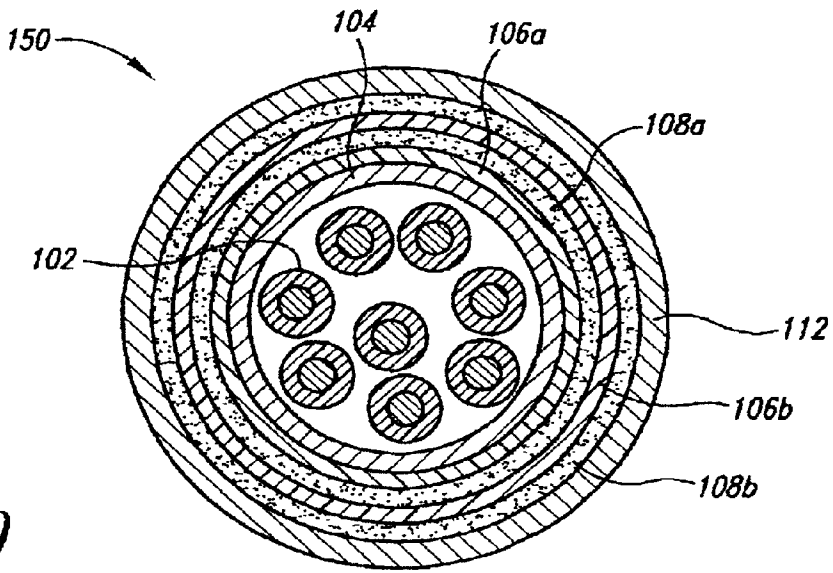
FIG. 9 is a cross sectional view of the fifth implementation of FIG. 8.

A fifth implementation 150 of the discontinuous cable shield system is shown in FIG. 8 and FIG. 9 as having first layer components of insulation 106a and shield segments 108a separated by segmentation gaps 110a underneath second layer components of insulation 106b and shield segments 108b separated by segmentation gaps 110b. The first layer components are longitudinally shifted with respect to the second layer components.

Figure 10:
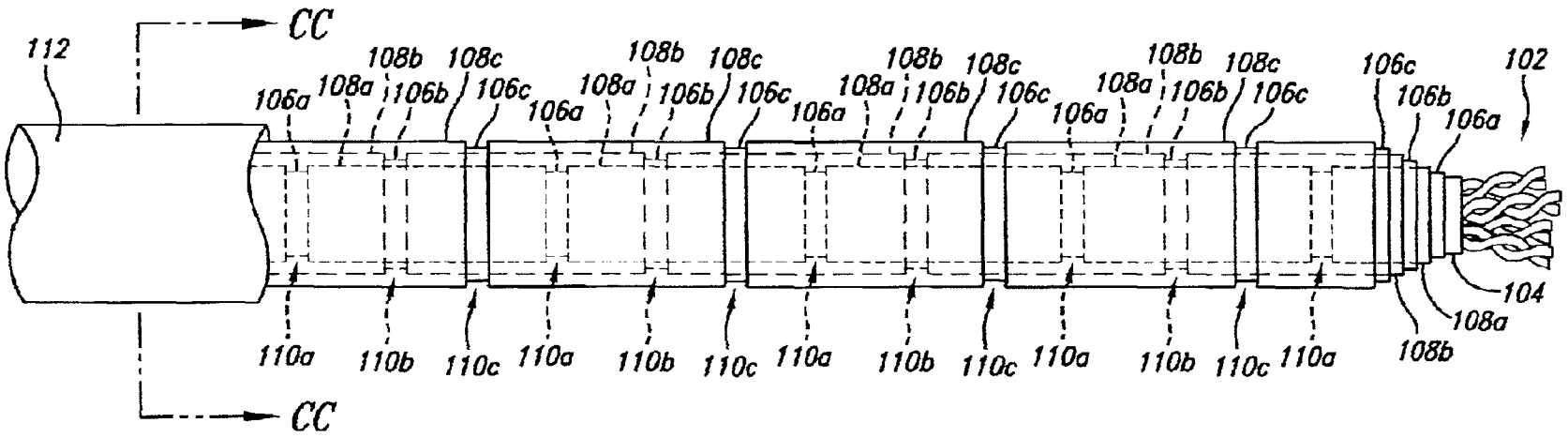
FIG. 10 is a side elevational view of a sixth implementation of the discontinuous cable shield system.
Figure 11:
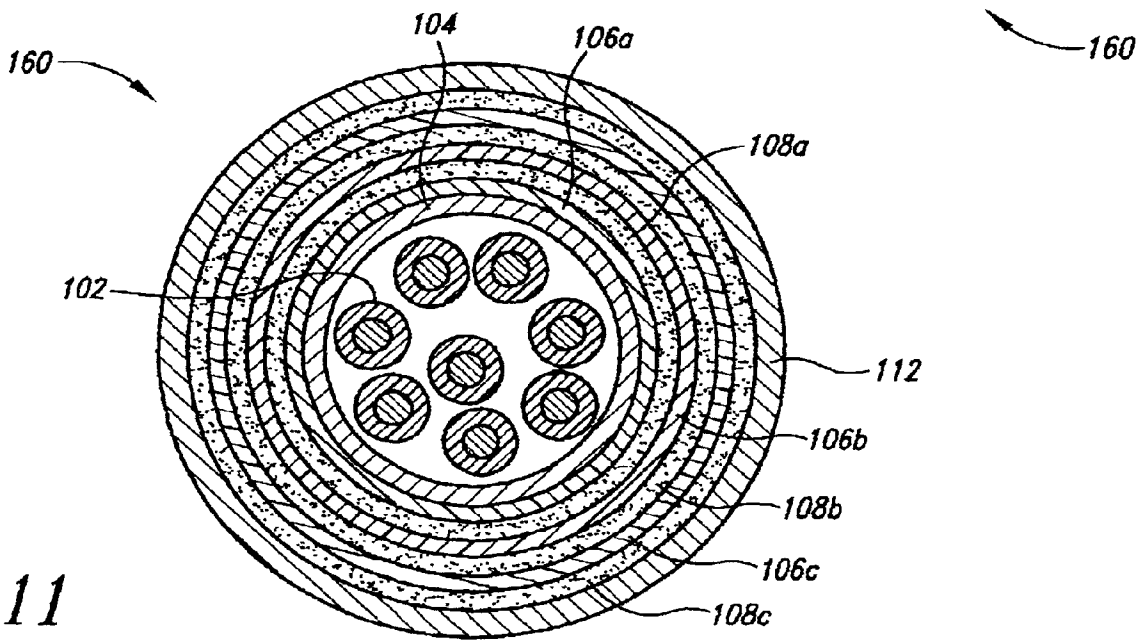
FIG. 11 is a cross sectional view of the sixth implementation of FIG. 10.

A sixth implementation 160 of the discontinuous cable shield system is shown in FIG. 10 and FIG. 11 as having first layer components of insulation 106a and shield segments 108a separated by a segmentation gaps 110a, underneath second layer components of insulation 106b and shield segments 108b separated by segmentation gaps 110b, underneath third layer components of insulation 106c and shield segments 108c separated by segmentation gaps 110c. The first layer components, the second layer components, and the third layer components are longitudinally shifted with respect to one another.

Figure 12:
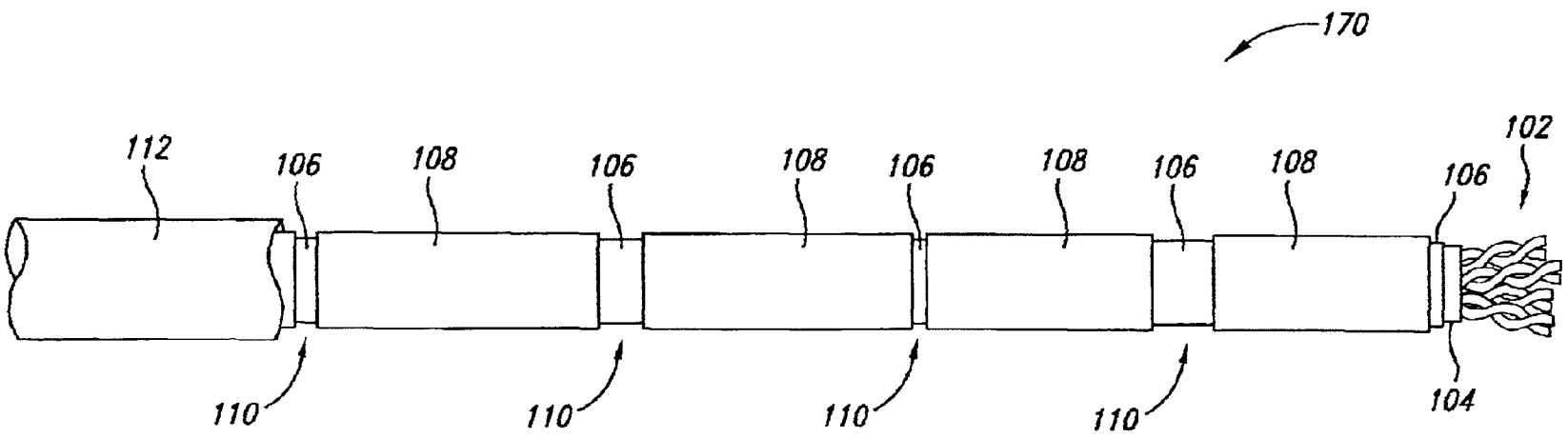
FIG. 12 is a side elevational view of a seventh implementation of the discontinuous cable shield system.

A seventh implementation 170 of the discontinuous cable shield system is shown in FIG. 12 as having different longitudinal lengths for the segmentation gaps 110.

Figure 13:
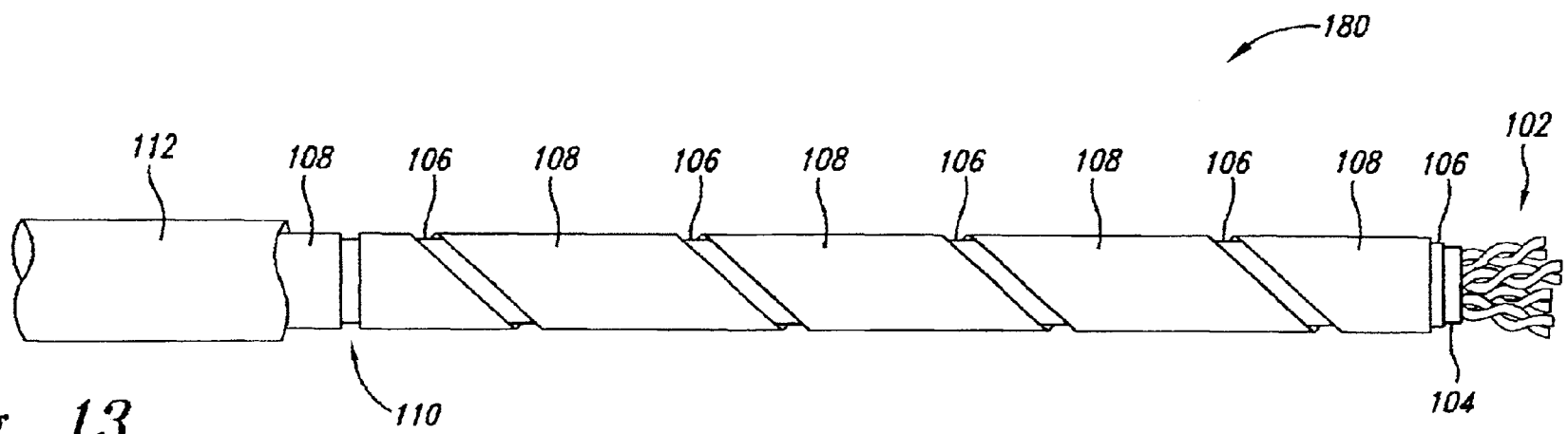
FIG. 13 is a side elevational view of an eighth implementation of the discontinuous cable shield system.

An eighth implementation 180 of the discontinuous cable shield system is shown in FIG. 13 as having a spiral pattern for the segmentation gaps 110.

Figure 14:
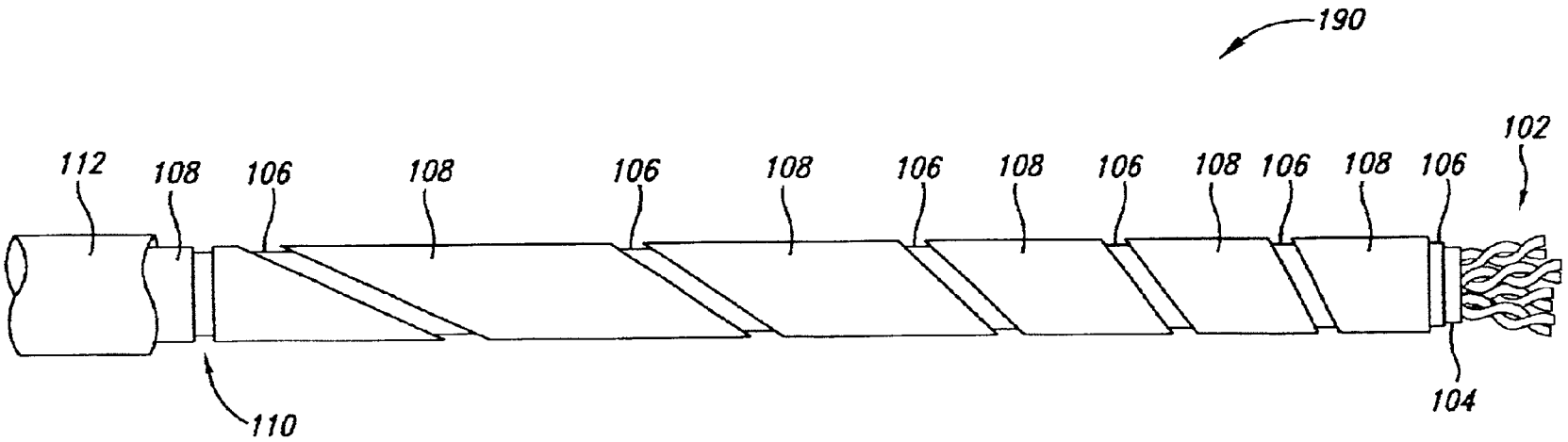
FIG. 14 is a side elevational view of a ninth implementation of the discontinuous cable shield system.

A ninth implementation 190 of the discontinuous cable shield system is shown in FIG. 14 as having spiral patterns having different pitch angles for the segmentation gaps 110.

Figure 15:
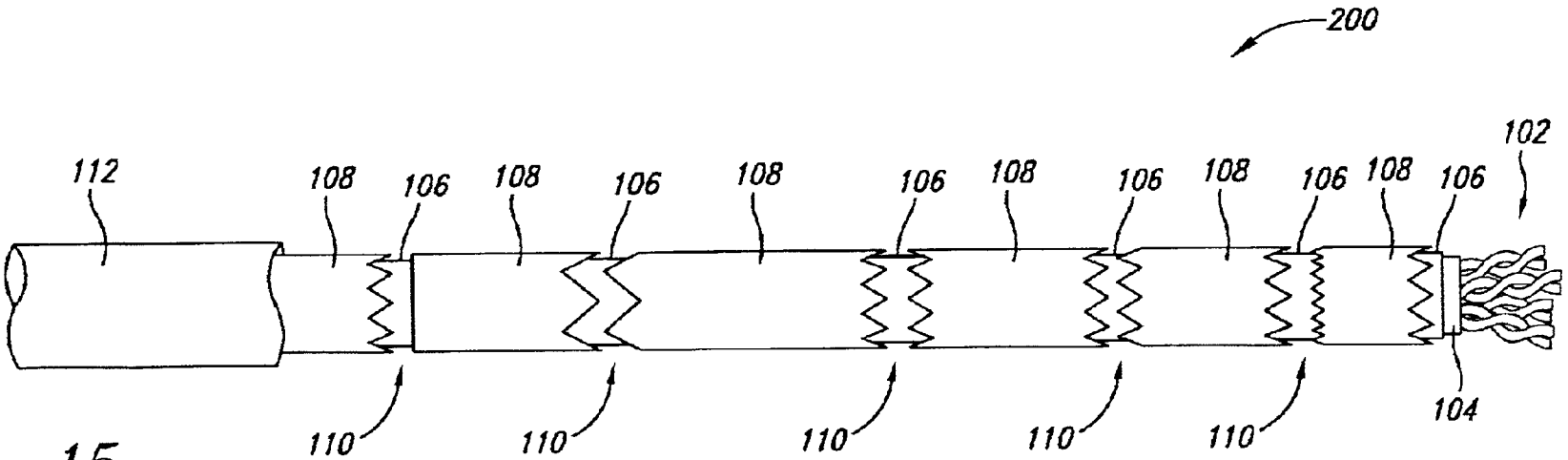
FIG. 15 is a side elevational view of a tenth implementation of the discontinuous cable shield system.

A tenth implementation 200 of the discontinuous cable shield system is shown in FIG. 15 as having varying jagged shaped patterns for the segmentation gaps 110.

Figure 16:
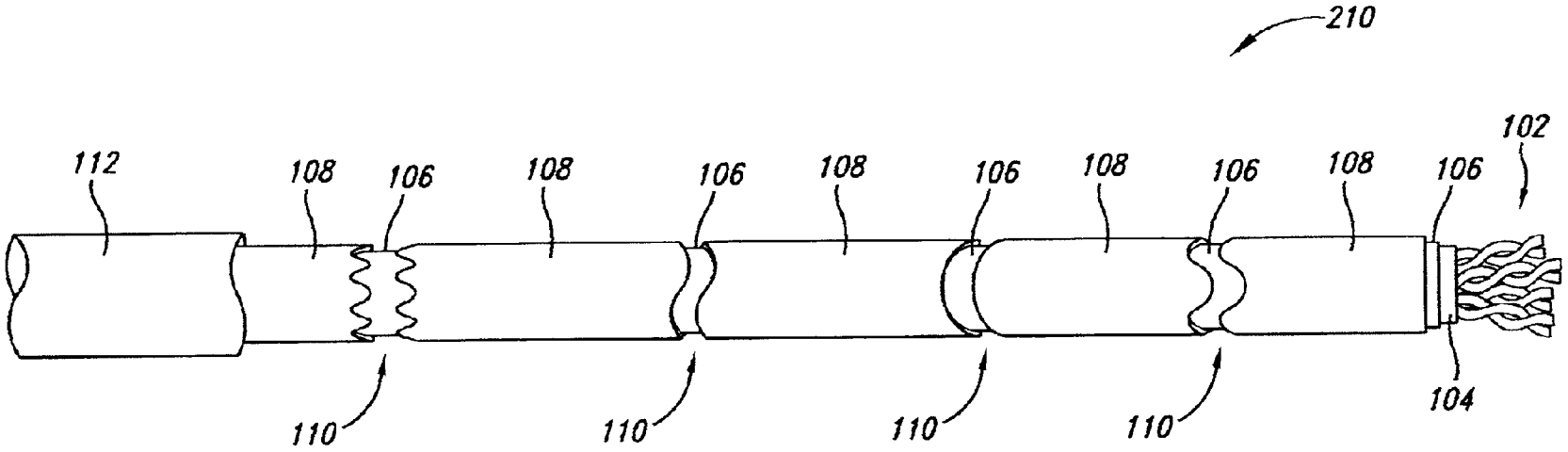
FIG. 16 is a side elevational view of an eleventh implementation of the discontinuous cable shield system.

A eleventh implementation 210 of the discontinuous cable shield system is shown in FIG. 16 as having varying wave patterns for the segmentation gaps 110.

Figure 17:
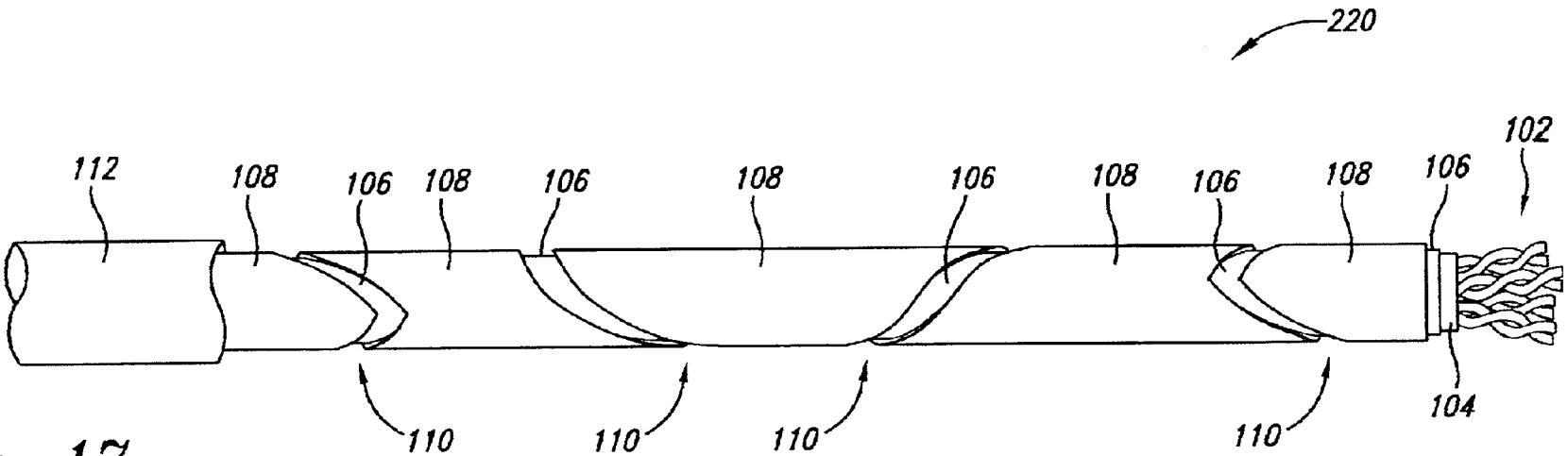
FIG. 17 is a side elevational view of a twelfth implementation of the discontinuous cable shield system.

A twelfth implementation 220 of the discontinuous cable shield system is shown in FIG. 17 as having irregular patterns for the segmentation gaps 110.

Figure 18:
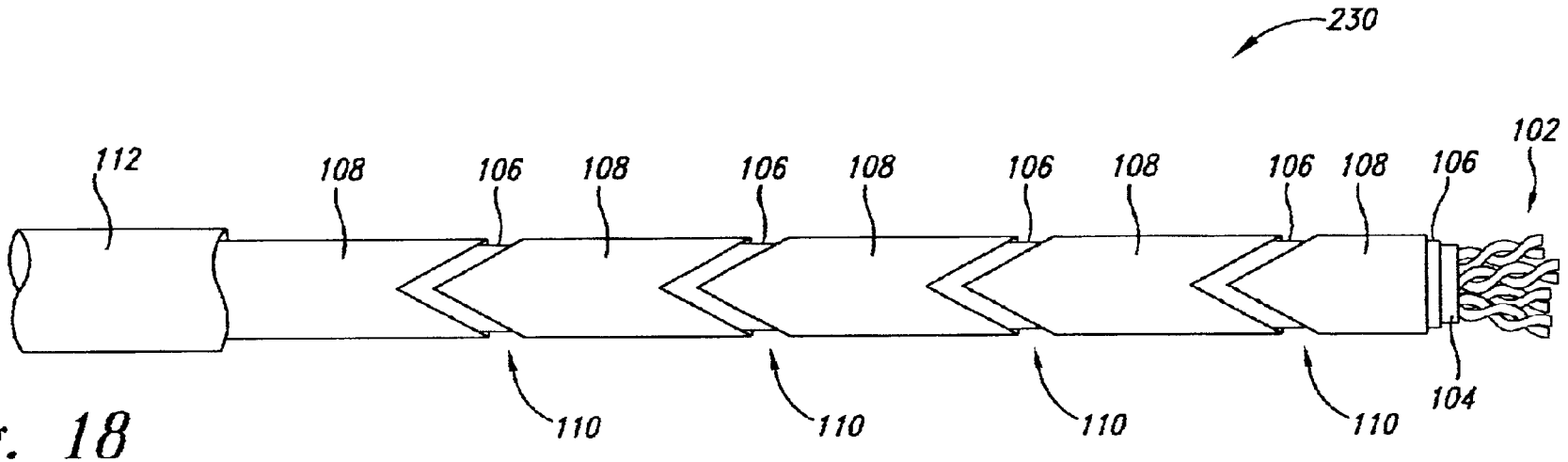
FIG. 18 is a side elevational view of a thirteenth implementation of the discontinuous cable shield system.

A thirteenth implementation 230 of the discontinuous cable shield system is shown in FIG. 18 as having similar angular patterns for the segmentation gaps 110.

Figure 19:
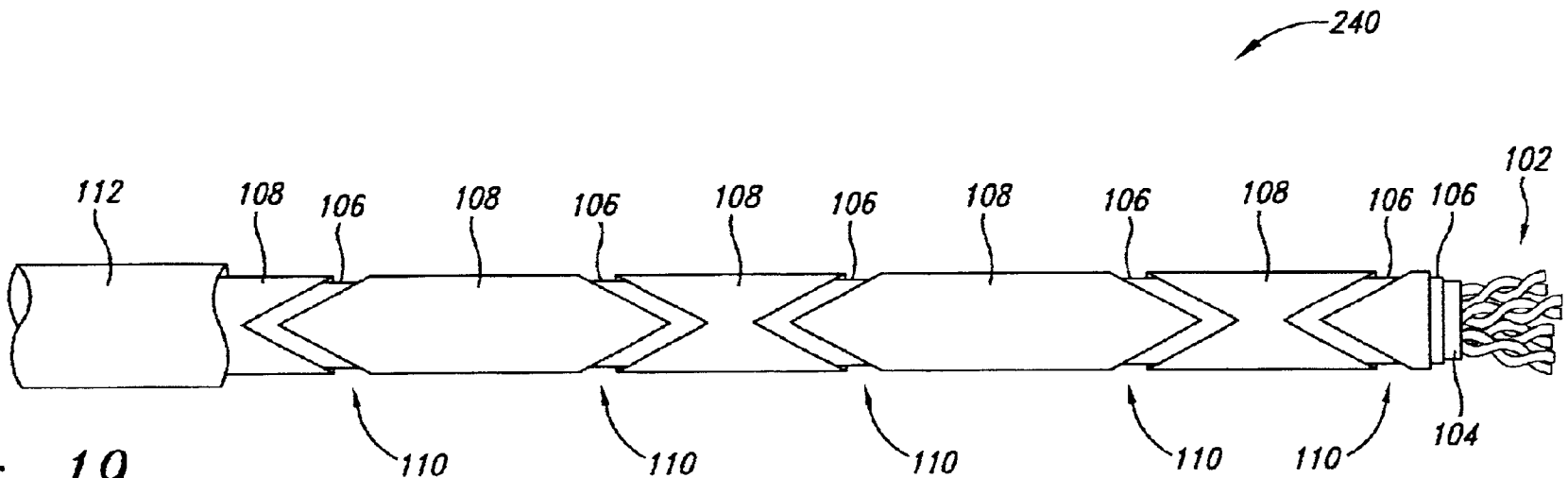
FIG. 19 is a side elevational view of a fourteenth implementation of the discontinuous cable shield system.

A fourteenth implementation 240 of the discontinuous cable shield system is shown in FIG. 19 as having opposing angular patterns for the segmentation gaps 110.

Figure 20:
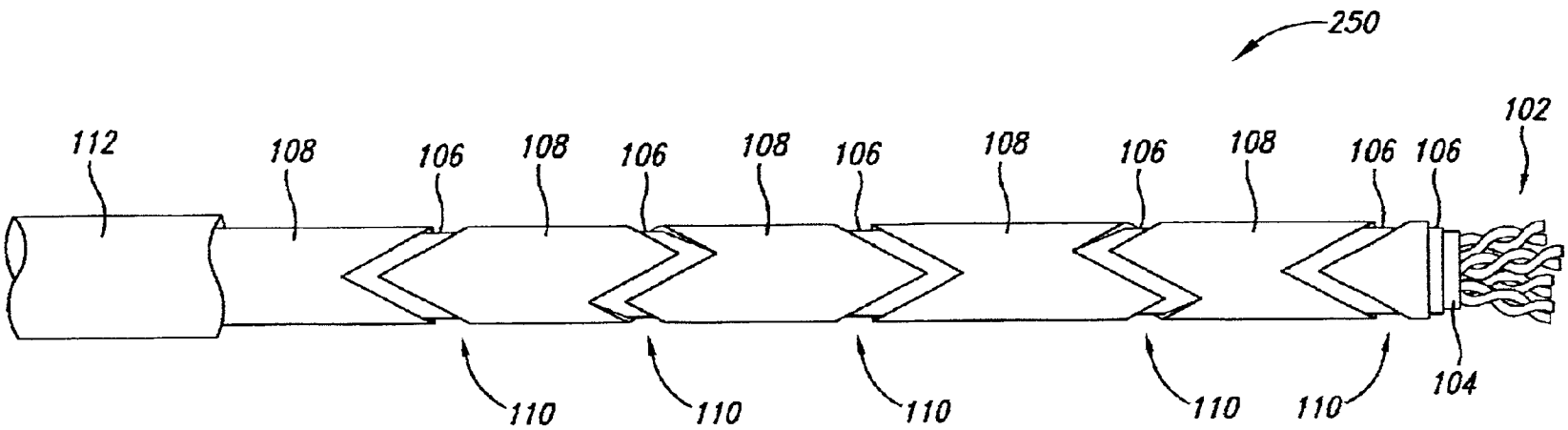
FIG. 20 is a side elevational view of a fifteenth implementation of the discontinuous cable shield system.

A fifteenth implementation 250 of the discontinuous cable shield system is shown in FIG. 20 as having multiple angular patterns for the segmentation gaps 110.

Figure 21:
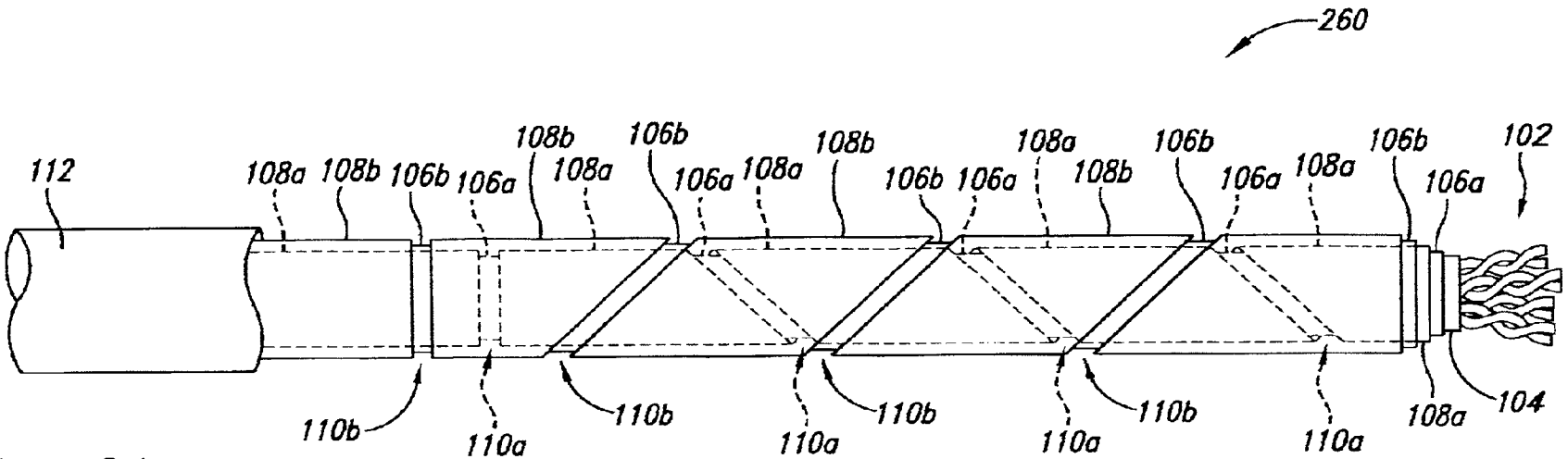
FIG. 21 is a side elevational view of a sixteenth second implementation of the discontinuous cable shield system.

A sixteenth implementation 260 of the discontinuous cable shield system is shown in FIG. 21 as having first layer components of insulation 106a and shield segments 108a separated by a segmentation gap 110a spiraling in a first direction underneath second layer components of insulation 106b and shield segments 108b separated by a segmentation gap 110b spiraling in a second direction opposite the first direction.

Figure 22:
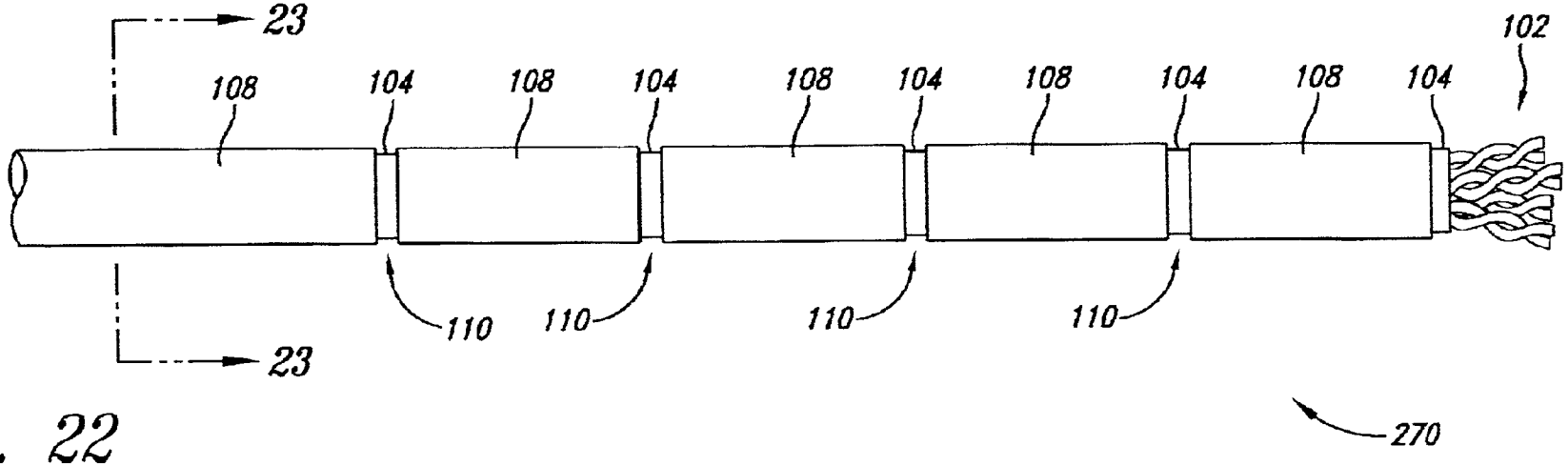
FIG. 22 is a side elevational view of a seventeenth implementation of the discontinuous cable shield system.
Figure 23:
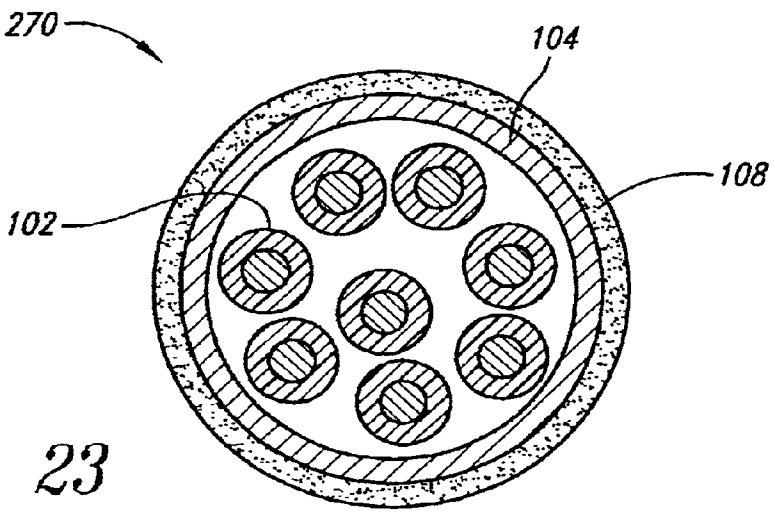
FIG. 23 is a cross sectional view of the seventeenth implementation of FIG. 22.

A seventeenth implementation 270 of the discontinuous cable shield system is shown in FIG. 22 and FIG. 23 as having the separated shield segments 108 directly covering the inner cable sheath 104.

Figure 24:
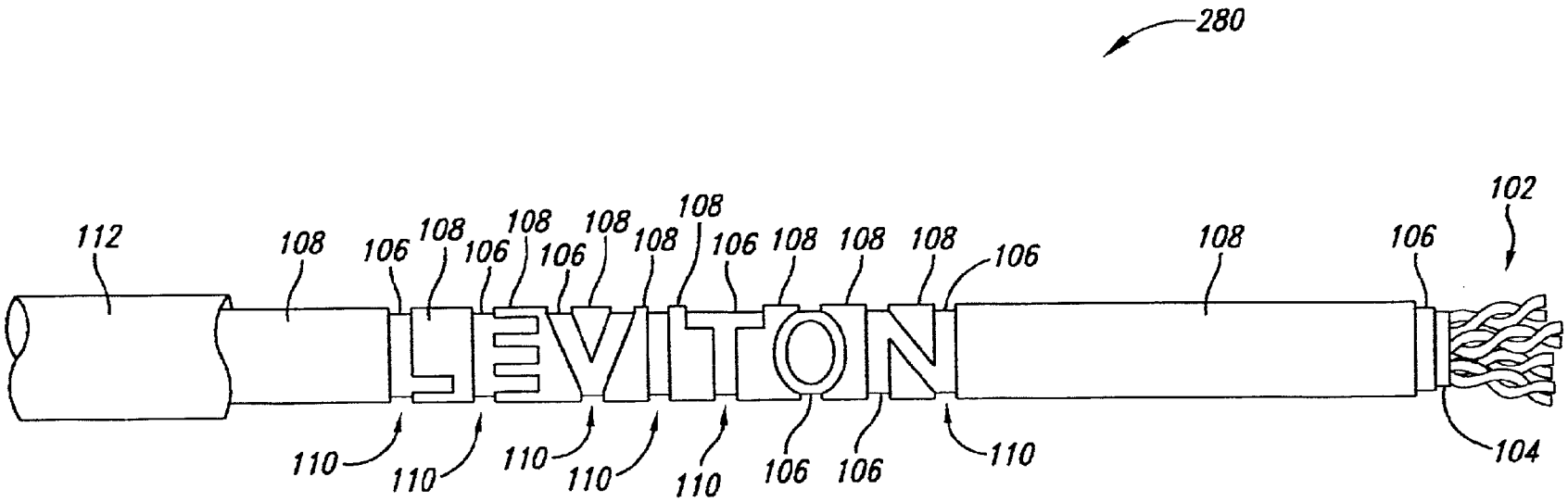
FIG. 24 is a side elevational view of an eighteenth implementation of the discontinuous cable shield system.

A eighteenth implementation 280 of the discontinuous cable shield system is shown in FIG. 24 as having the segmentation gaps 110 shaped to spelled a company name, Leviton.

Figure 25:
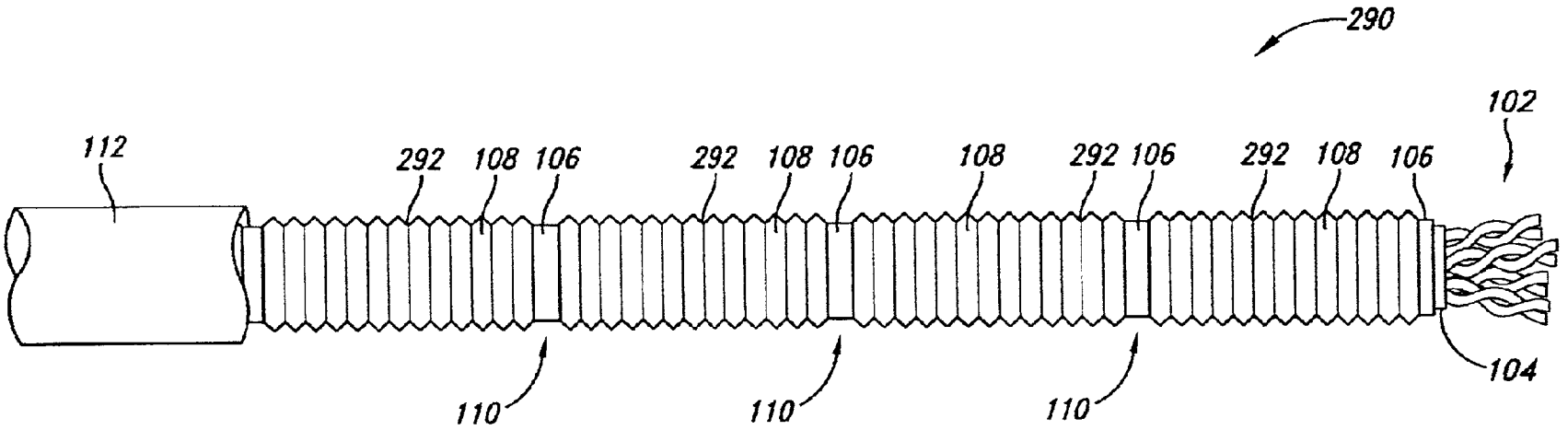
FIG. 25 is a side elevational view of a nineteenth implementation of the discontinuous cable shield system.

A nineteenth implementation 290 of the discontinuous cable shield system is shown in FIG. 25 as having the separated shield segments 108 containing radially oriented corrugations [242] *292* to aid in bending the implementation.

Figure 26:
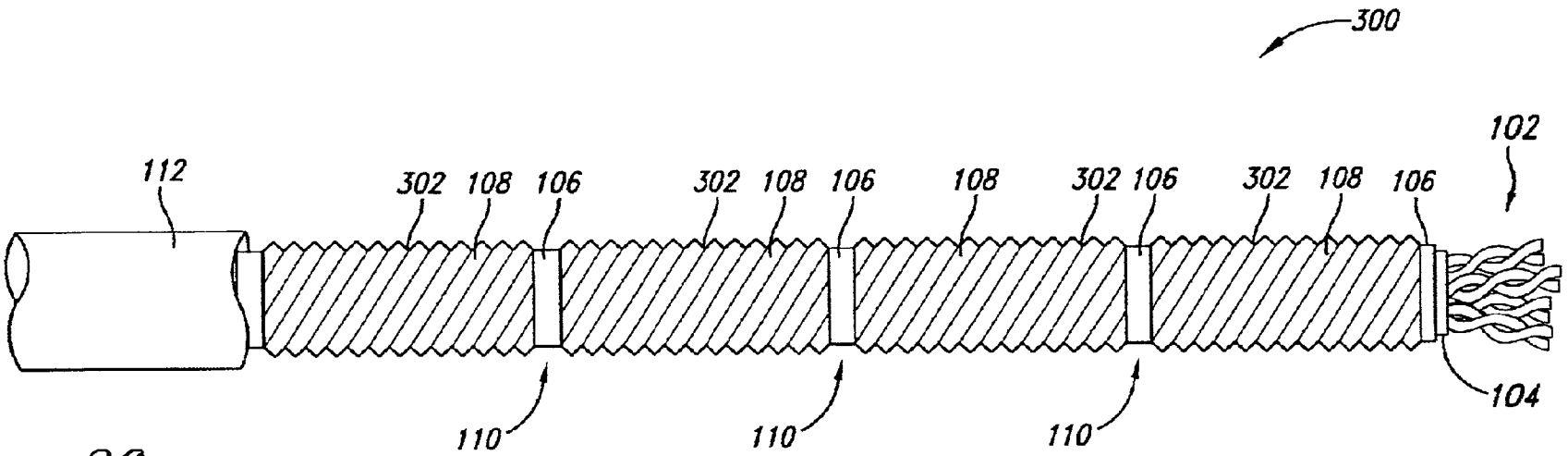
FIG. 26 is a side elevational view of a twentieth implementation of the discontinuous cable shield system.

A twentieth implementation 300 of the discontinuous cable shield system is shown in FIG. 26 as having the separated shield segments 108 containing diagonally oriented corrugations [242] *302* to aid in bending the implementation.

Figure 27:
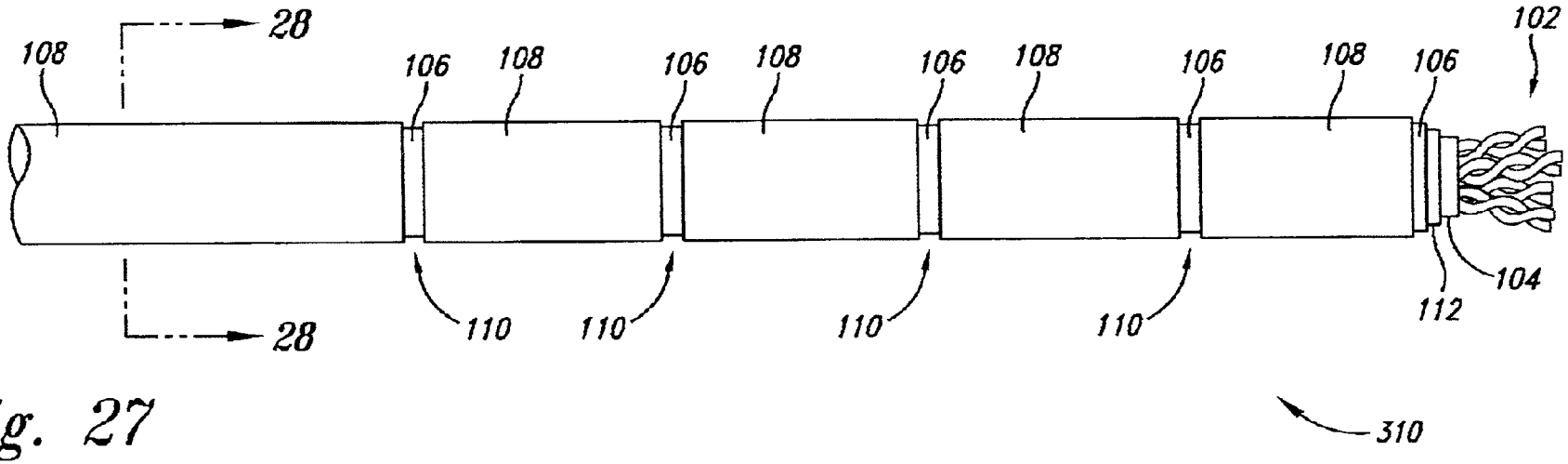
FIG. 27 is a side elevational view of a twenty-first implementation of the discontinuous cable shield system.
Figure 28:
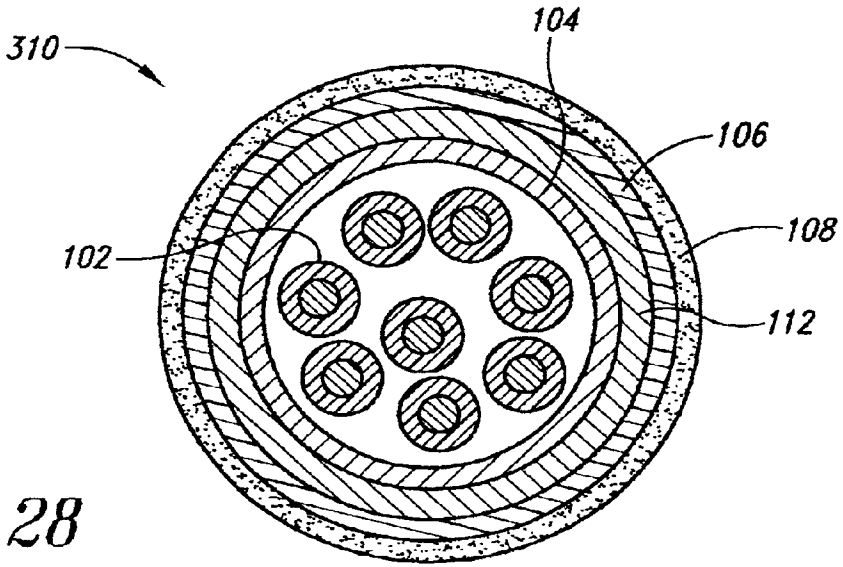
FIG. 28 is a cross sectional view of the twenty-first implementation of FIG. 27.

A twenty-first implementation 310 of the discontinuous cable shield system is shown in FIG. 27 and in FIG. 28 as having the insulation 106 covering the outer cable sheath 112 and the separated shield segments 108 covering the insulation.

Figure 29:
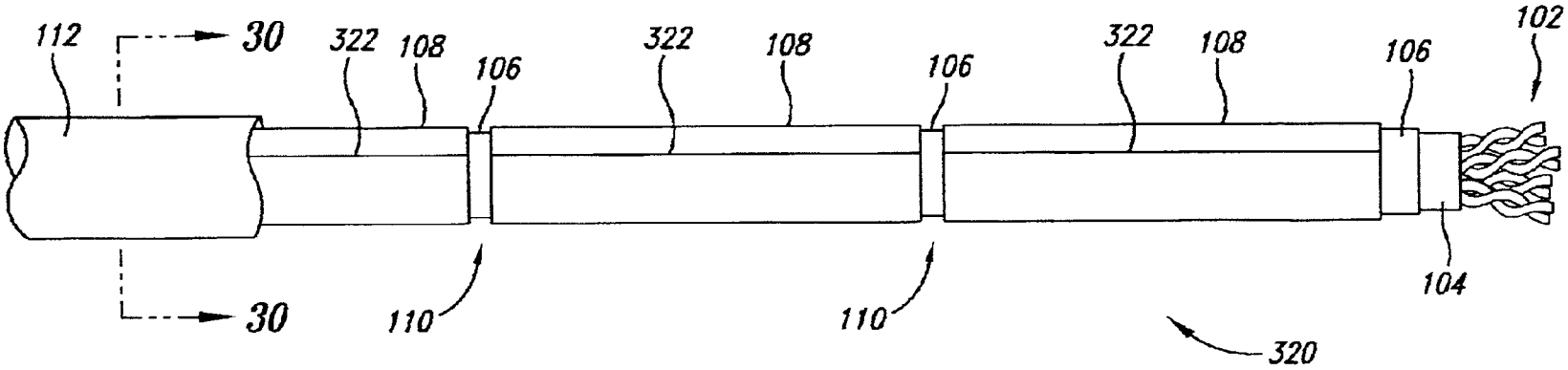
FIG. 29 is a side elevational view of a twenty-second implementation of the discontinuous cable shield system.
Figure 30:
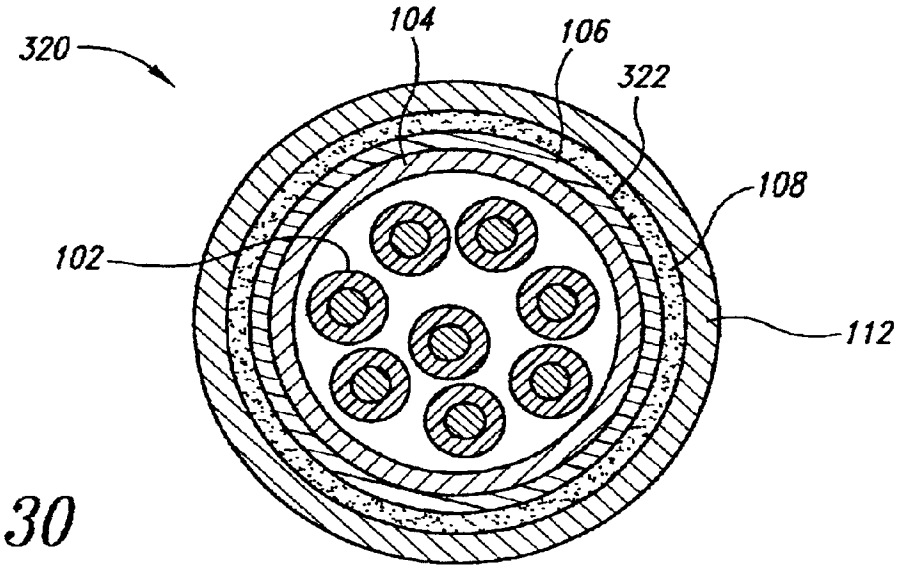
FIG. 30 is a cross sectional view of the twenty-second implementation of FIG. 29.

A twenty-second implementation 320 of the discontinuous cable shield system is shown in FIG. 29 and FIG. 30 as having the separated shield segments 108 formed with a longitudinally abutted seam 322.

Figure 31:
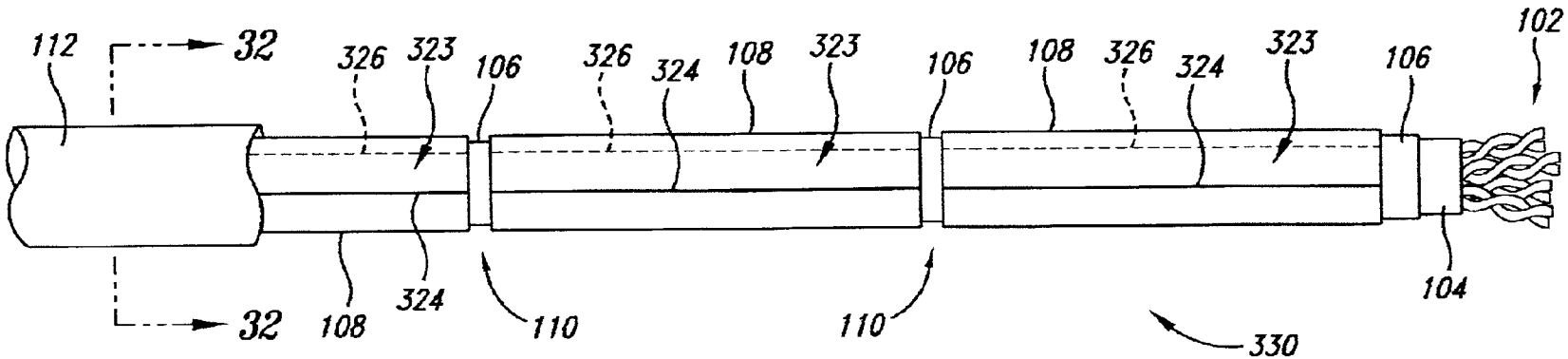
FIG. 31 is a side elevational view of a twenty-third implementation of the discontinuous cable shield system.
Figure 32:
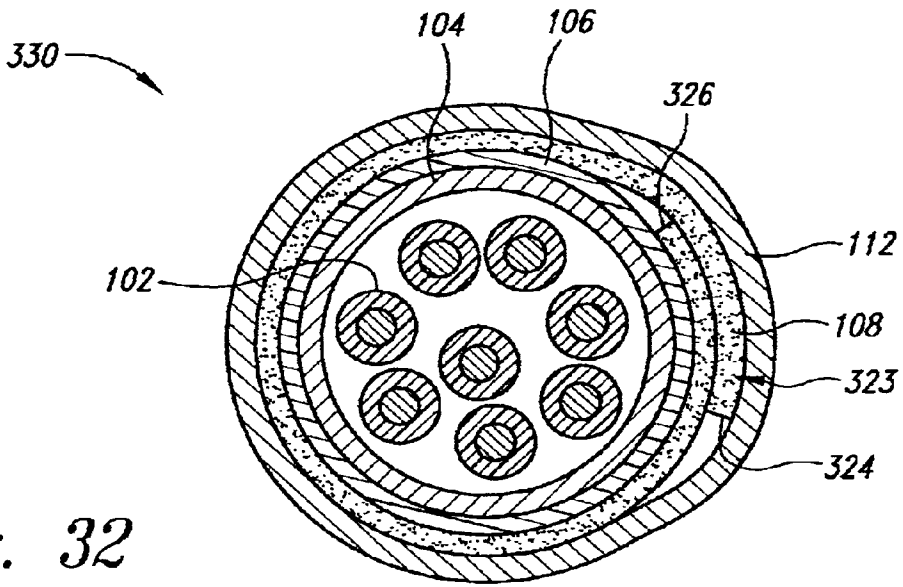
FIG. 32 is a cross sectional view of the twenty-third implementation of FIG. 31.

A twenty-third implementation 330 of the discontinuous cable shield system is shown in FIG. 31 and FIG. 32 as having the separated shield segments 108 formed with a longitudinally overlapping seam 323 with an overlap portion between a first boundary 324 and a second boundary 326.

Figure 33:
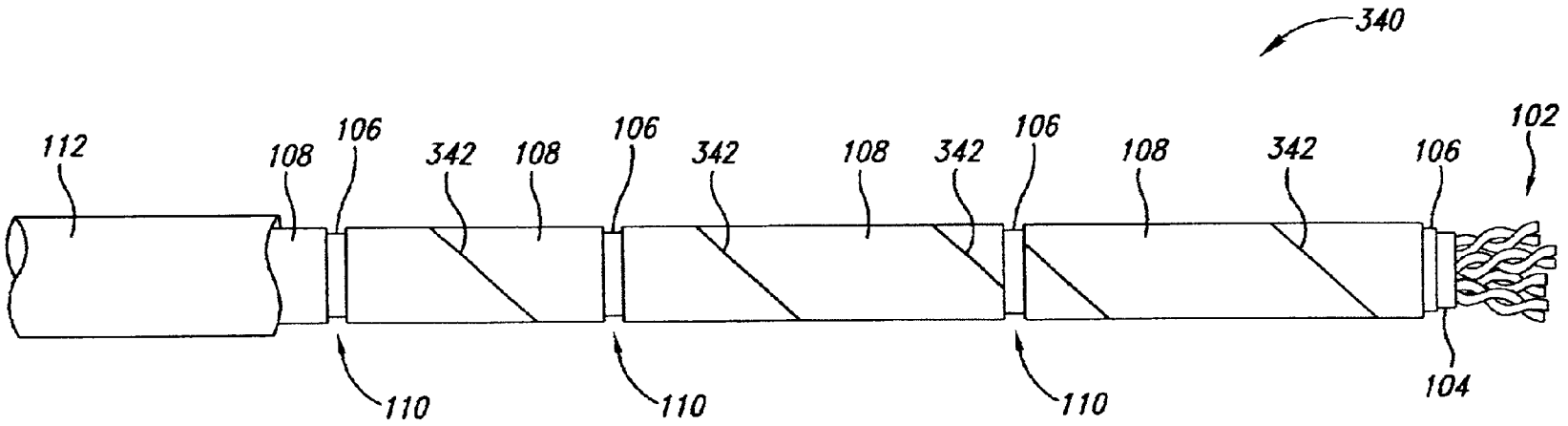
FIG. 33 is a side elevational view of a twenty-fourth implementation of the discontinuous cable shield system.

A twenty-fourth implementation 340 of the discontinuous cable shield system is shown in FIG. 33 as having the separated shield segments 108 formed with a spirally abutted seam 342.

Figure 34:
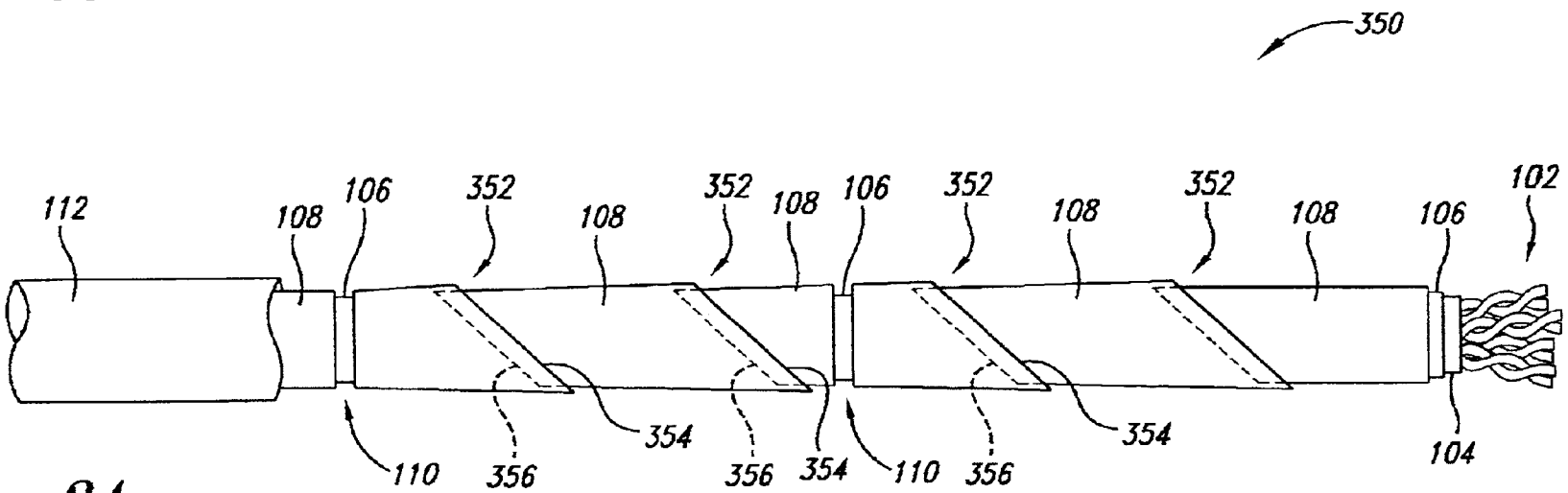
FIG. 34 is a side elevational view of a twenty-fifth implementation of the discontinuous cable shield system.

A twenty-fifth implementation 350 of the discontinuous cable shield system is shown in FIG. 34 as having the separated shield segments 108 formed with a spirally overlapping seam [342] *352* with an overlap portion between a first boundary 354 and a second boundary 356.

Figure 35:
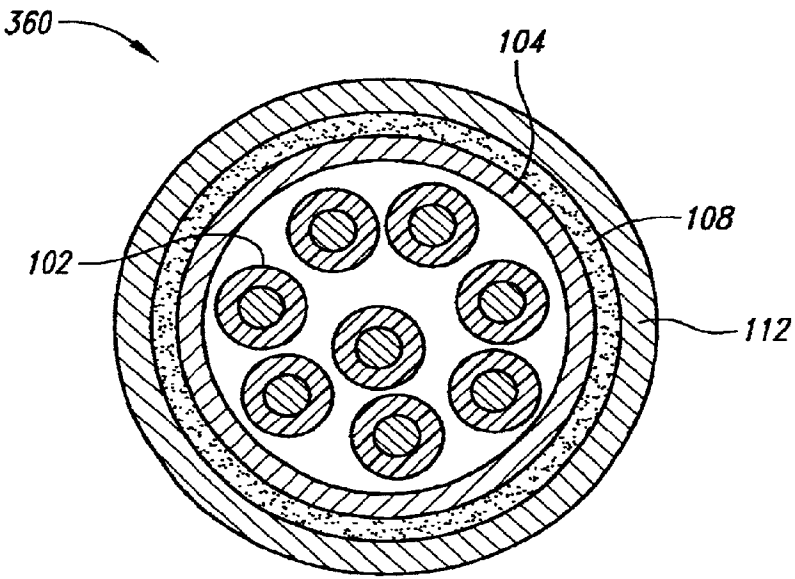
FIG. 35 is a cross-sectional view of a twenty-sixth implementation of the discontinuous cable shield system.

A twenty-sixth implementation 360 of the discontinuous cable shield system is shown in FIG. 35 as having the outer cable sheath 112 covering the separated shield segments 108, which are covering the inner cable sheath [102] *104*.

Figure 36:
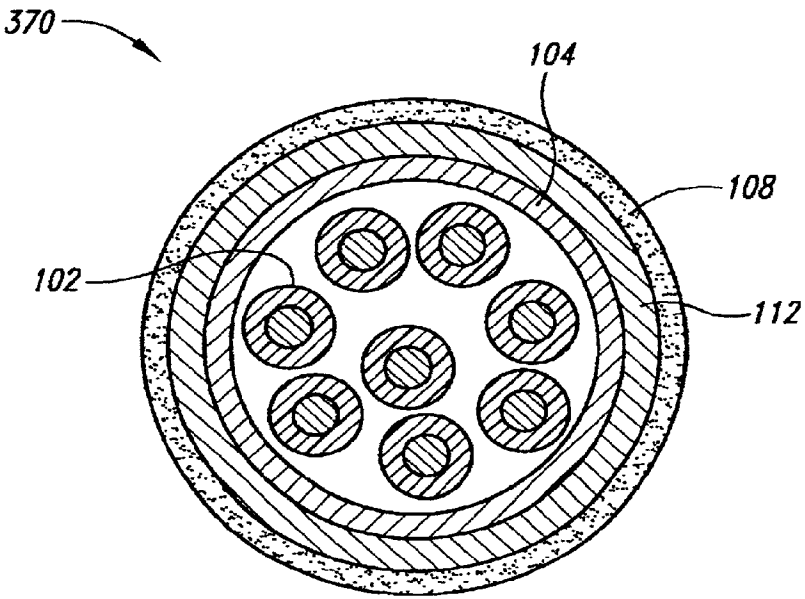
FIG. 36 is a cross-sectional view of a twenty-seventh implementation of the discontinuous cable shield system.

A twenty-seventh implementation 370 of the discontinuous cable shield system is shown in FIG. 36 as having the separated shield segments 108 covering the outer cable sheath 112, which is covering the inner cable sheath [102] *104*.

Figure 37:
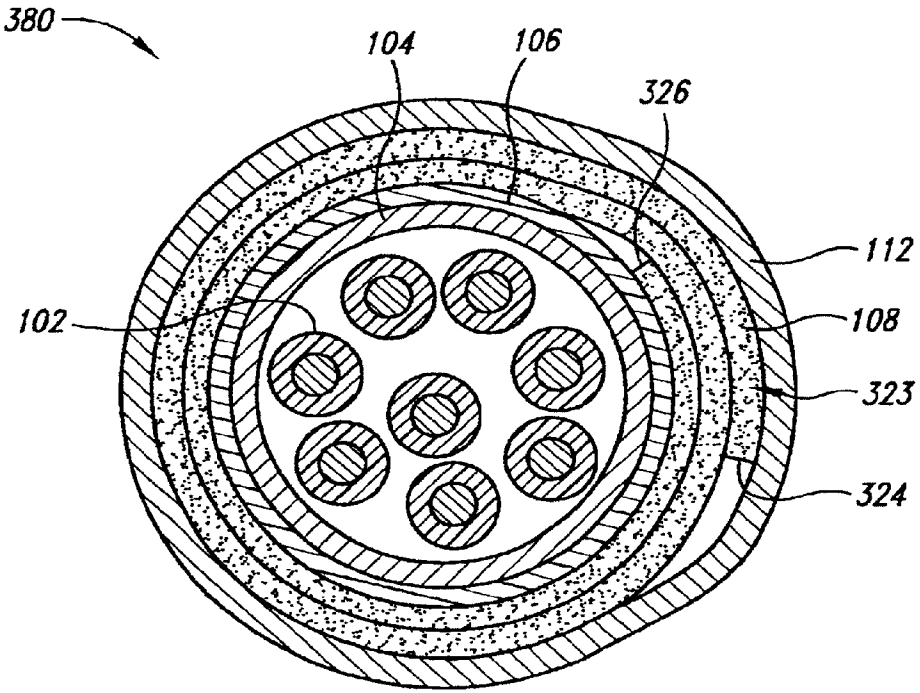
FIG. 37 is a cross-sectional view of a twenty-eighth implementation of the discontinuous cable shield system.

A twenty-eighth implementation 380 of the discontinuous cable shield system is shown in FIG. 37 as having the separated shield segments 108 formed with a longitudinally double overlapping seam 323 with an overlap portion between the first boundary 324 and the second boundary 326.

Figure 38:
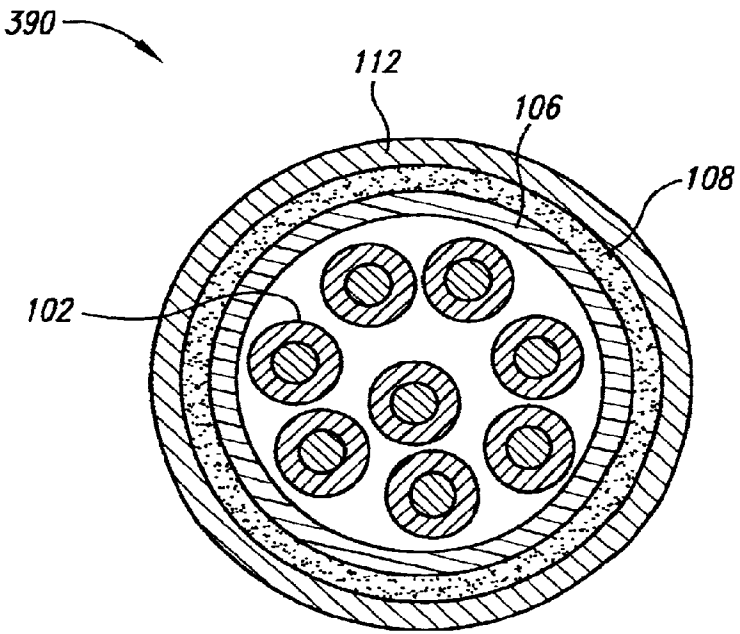
FIG. 38 is a cross-sectional view of a twenty-ninth implementation of the discontinuous cable shield system.

A twenty-ninth implementation 390 of the discontinuous cable shield system is shown in FIG. 38 as having the insulation 106 covering the twisted wire pairs 102.

Figure 39:
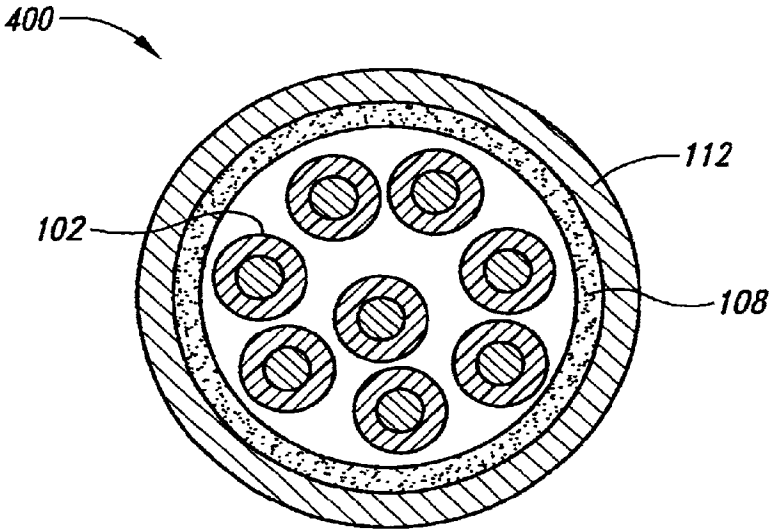
FIG. 39 is a cross-sectional view of a thirtieth implementation of the discontinuous cable shield system.

A thirtieth implementation 400 of the discontinuous cable shield system is shown in FIG. 39 as having the separated shield segments 108 covering the twisted wire pairs 102.

Figure 40:
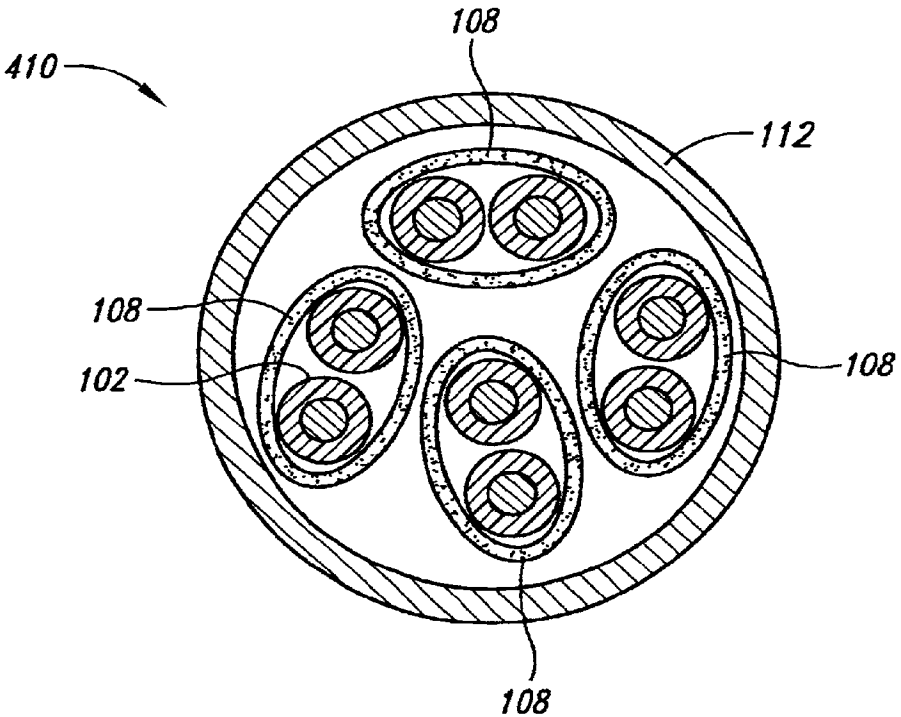
FIG. 40 is a cross-sectional view of a thirty-first implementation of the discontinuous cable shield system.

A thirty-first implementation 410 of the discontinuous cable shield system is shown in FIG. 40 as having the individual instances of the separated shield segments 108 covering individual ones of the twisted wire pairs 102.

Figure 41:
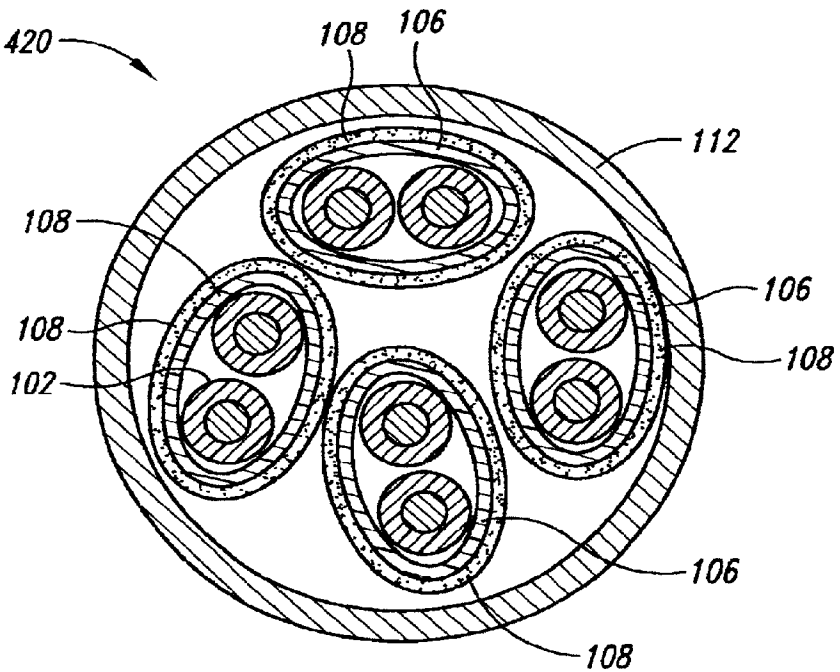
FIG. 41 is a cross-sectional view of a thirty-second implementation of the discontinuous cable shield system.

A thirty-second implementation 420 of the discontinuous cable shield system is shown in FIG. 41 as having individual instances of a first layer 108a underneath a second layer 108b of the separated shield segments 108 both covering individual ones of the twisted wire pairs 102.

Figure 42:
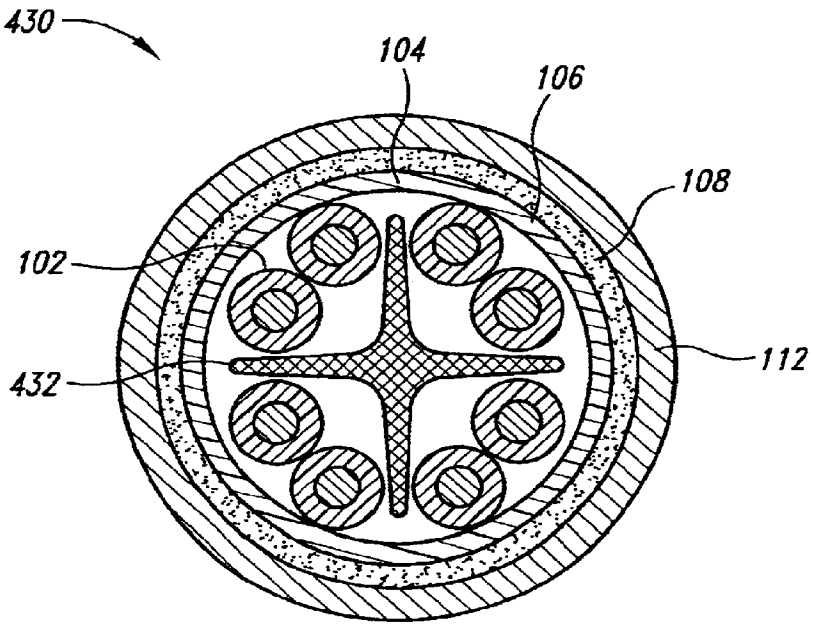
FIG. 42 is a cross-sectional view of a thirty-third implementation of the discontinuous cable shield system.

A thirty-third implementation 430 of the discontinuous cable shield system is shown in FIG. 42 as having the twisted wire pairs 102, the inner cable sheath 104, the insulation 106, the separated shield segments 108 and the outer cable sheath 112 in an arrangement similar to the first implementation 100. In addition, the thirty-third implementation 430 has a spacer 432 to separate the individual twisted wire pairs 102 from one another.

Figure 43:
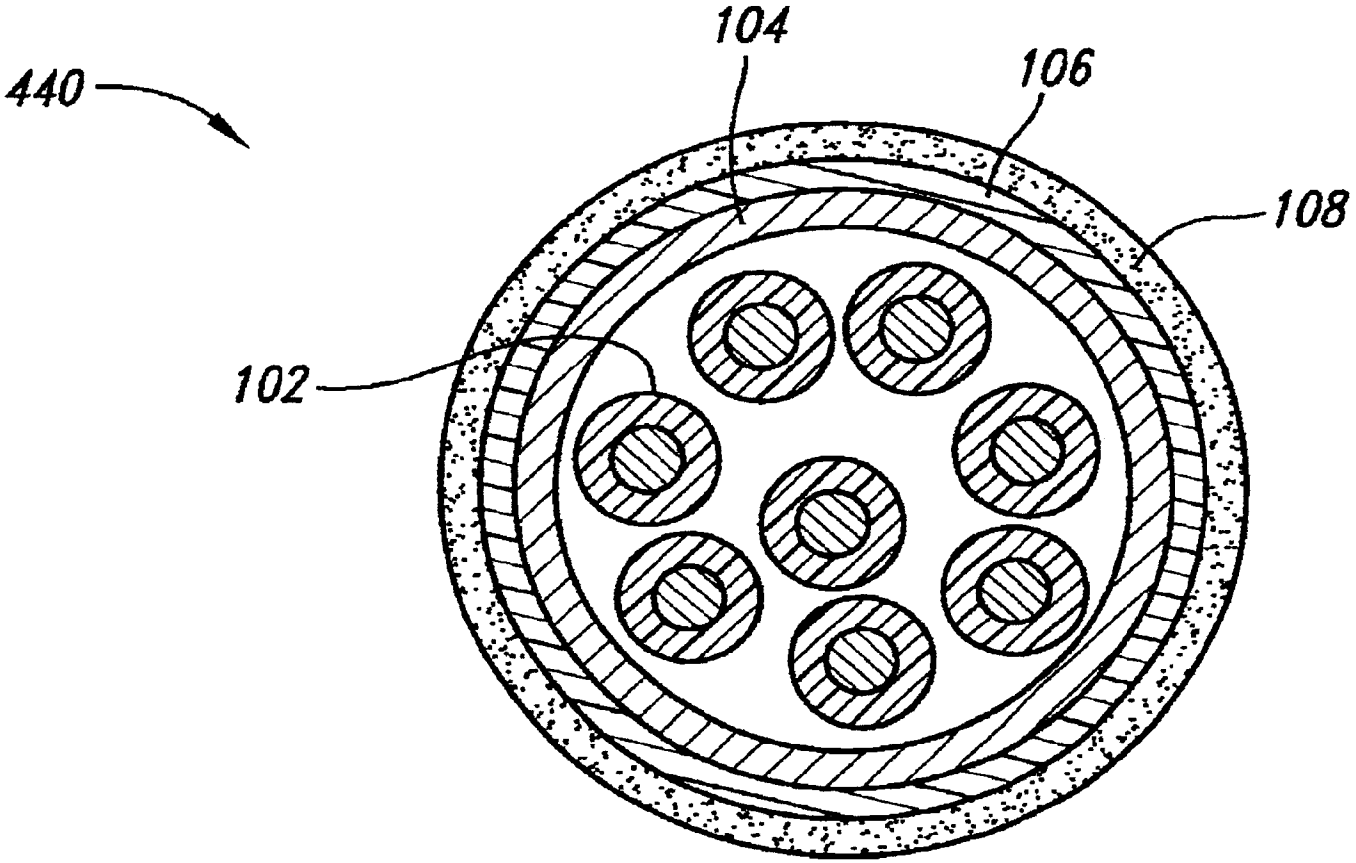
FIG. 43 is a cross-sectional view of a thirty-fourth implementation of the discontinuous cable shield system.

A thirty-fourth implementation 440 of the discontinuous cable shield system is shown in FIG. 43 as having the separated shield segments 108 without the outer cable sheath 112.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A cable having a length along a longitudinal dimension, the cable comprising:

a plurality of differential transmission lines extending along the longitudinal dimension;

a first plurality of shield segments, each shield segment extending along the longitudinal dimension along a portion of the cable length, each of the shield segments of the first plurality of shield segments extending circumferentially about the plurality of the differential transmission lines;

a second plurality of shield segments, each shield segment extending along the longitudinal dimension along a portion of the cable length, each of the shield segments of the second plurality of shield segments extending circumferentially about the plurality of the differential transmission lines, each of the shield segments of the first and second pluralities of shield segments being in electrical isolation from all other shield segments of the first and second pluralities of shield segments, each of the shield segments of the first and second pluralities of shield segments being separated from a shield segment adjacent thereto by a segmentation gap, each segmentation gap extending circumferentially about the plurality of the differential transmission lines, the shield segments of the first plurality of shield segments varying in form from the shield segments of the second plurality of shield segments.

2. The cable of claim 1 wherein the shield segments of the first plurality of shield segments vary in form from the shield segments of the second plurality of shield segments by extending different amounts along the longitudinal dimension.

3. The cable of claim 1 wherein the shield segments of the first plurality of shield segments vary in form from the shield segments of the second plurality of shield segments by having different shapes.

4. The cable of claim 1 wherein at least some of the shield segments of the first plurality of shield segments vary in form from one another and at least some of the shield segments of the second plurality of shield segments vary in form from one another.

5. The cable of claim 1 wherein the shield segments of the first and second pluralities of shield segments are made from an electrically conductive material.

6. The cable of claim 1 wherein each of the differential transmission lines is a twisted wire pair.

7. The cable of claim [2] *6* wherein each of the twisted wire pairs are covered by a different group of the shield segments of the first and second pluralities of the shield segments.

8. The cable of claim 1 wherein the shield segments of the first and second pluralities of shield segments are shaped so that each of the shield segments of the first plurality of shield segments extend circumferentially about the plurality of the differential transmission lines at a different angle than each of the shield segments of the second plurality of shield segments extend circumferentially about the plurality of the differential transmission lines.

9. The cable of claim 1 wherein each of the shield segments of the first plurality of shield segments have a first shape and each of the shield segments of the second plurality of shield segments have a second shape other than the first shape.

10. The cable of claim 9 wherein the first shape and the second shape are different jagged patterns.

11. The cable of claim 9 wherein the first shape and the second shape are different wave patterns.

12. The cable of claim 9 wherein the first shape and the second shape are different irregular patterns.

13. The cable of claim 9 wherein the first shape and the second shape have different angular patterns.

14. The cable of claim 1 wherein the shield segments of the first plurality of shield segments are differently oriented from the shield segments of the second plurality of shield segments.

15. The cable of claim 1 further comprising an electrically lossy material extending about each of the segmentation gaps.

16. The cable of claim 1 wherein the segmentation gaps include a first plurality and a second plurality, each of the first plurality being of a different form than each of the second plurality.

17. The cable of claim 1 further comprising an inner cable sheath and insulation extending about the plurality of the differential transmission lines wherein the shield segments of the first and second pluralities of shield segments extend about the inner cable sheath and the insulation.

18. The cable of claim 1 further comprising an outer cable sheath extending about the plurality of differential transmission lines and the shield segments of the first and second pluralities of shield segments.

19. The cable of claim 1 further comprising an outer cable sheath extending about the plurality of differential transmission lines wherein the outer cable sheath extends about the segmentation gaps.

20. The cable of claim 1 further comprising a third plurality of shield segments and a fourth plurality of shield segments wherein the shield segments of the third plurality of shield segments vary in form from the shield segments of the fourth plurality of shield segments, each of the shield segments of the third plurality of shield segments extending along the longitudinal dimension along a portion of the cable length and extending circumferentially about at least a portion of the shield segments of the first plurality of shield segments and extending about the plurality of the differential transmission lines, each of the shield segments of the third plurality of shield segments being in electrical isolation from the shield segments of the first, second and fourth pluralities of shield segments and from others of the shield segments of the third plurality of shield segments, and each of the shield segments of the fourth plurality of shield segments extending along the longitudinal dimension along a portion of the cable length and extending circumferentially about at least a portion of the shield segments of the second plurality and extending about the plurality of the differential transmission lines, each of the shield segments of the fourth plurality of shield segments being in electrical isolation from the shield segments of the first, second and third pluralities of shield segments and from the others of the shield segments of the fourth plurality of shield segments.

21. The cable of claim 1 wherein the shield segments of the first and second pluralities of shield segments are formed from at least one of the following: adhesive backed foil, foil thermally coupled with plastic sheath, metalized spray, and ink.

22. A method comprising:

providing a plurality of differential transmission lines;

providing a plurality of shield segments;

positioning each of the plurality of shield segments within proximity of the differential transmission lines to substantially reduce potential of field interference;

positioning each of the plurality of shield segments to be in electrical isolation from one another; and selecting at least some of the plurality of shield segments to vary from each other in form to vary how the selected shield segments interact with electromagnetic energy across a spectrum of frequencies to diminish the number of the selected shield segments that would otherwise have a resonant interaction with electromagnetic energy of a particular frequency of the spectrum of frequencies.

23. The method of claim 22 wherein the selecting at least some of the plurality of shield segments to vary from each other includes selecting according to at least one of the following: size of the at least some of the plurality of shield segments and shape of the at least some of the plurality of shield segments.

24. The method of claim 23 wherein the selecting at least some of the plurality of shield segments to vary from each other includes selecting according to a dimension limit for the shield segments related to at least one of the following: twist rate pitch and differential pair spacing of the differential transmission lines.

25. The method of claim 23 wherein positioning each of the plurality of shield segments within proximity of the differential transmission lines to substantially reduce potential of field interference of at least one of the following types: field interference imparted upon the differentially transmission lines from an external source and field interference emitting from the differential transmission lines.

*26. An electrical signal transmission cable comprising:*

*at least one differential transmission line pair of twisted insulated conductive wires extending longitudinally along a length of cable for carrying electrical signals there-along; and*

*a plurality of electrically isolated conductive shield segments extending longitudinally along and at least partially circumferentially around respectively corresponding portions of at least one differential transmission line pair sufficient to effect, while in use carrying electrical communication signals there-along:*

*(a) substantial electrostatic coupling to each wire of at least one differential transmission line pair thereby tending to average together positive and negative electrostatic near-field emissions from the at least one differential transmission line pair, and*

*(b) substantial magnetic coupling via eddy currents to each wire of at least one differential transmission line pair thereby tending to average together oppositely directed magnetic field emissions from the at least one differential transmission line pair.*

*27. An electrical signal transmission cable as in claim 26 wherein at least some of said plurality of electrically isolated conductive shield segments extend entirely about the circumference of a respectively associated at least one differential transmission line pair.*

*28. An electrical signal transmission cable as in claim 27 wherein said at least some of said plurality of electrically isolated conductive shield segments provide a continuous electrically conductive path about the circumference of the respectively associated at least one differential transmission line pair.*

*29. An electrical signal transmission cable as in claim 26 wherein:*

*while in use carrying electrical communication signals there-along, each wire of said at least one differential transmission line pair exhibits a substantially equal and opposite electrical potential vis-à-vis the other wire of that pair along said length; and*

*a plurality of said differential transmission line pairs are encompassed by said plurality of electrically isolated conductive shield segments sufficiently to effect substantially equal electrostatic coupling to each wire of each of said plurality of differential transmission line pairs along respectively corresponding portions of said cable length.*

*30. An electrical signal transmission cable as in claim 26 wherein each said shield segment extends longitudinally for a distance that is at least a substantial portion of one differential transmission line twist rate pitch period.*

*31. An electrical signal transmission cable as in claim 26 wherein said plurality of electrically isolated conductive shield segments are of at least two different sizes.*

*32. An electrical signal transmission cable as in claim 31 wherein said different sizes comprise at least one of: (a) different longitudinal lengths, (b) different shapes, and (c) different thicknesses.*

*33. An electrical signal transmission cable as in claim 26 wherein minimum and maximum dimensions of each shield segment establish corresponding resonant frequencies higher than a highest intended frequency of electrical signals to be transmitted along said cable while in use carrying electrical communication signals there-along.*

*34. An electrical signal transmission cable as in claim 26 wherein at least some of said shield segments are spirally wrapped about the at least one differential transmission line.*

*35. An electrical signal transmission cable as in claim 26 wherein said shield segments are electrically isolated from each other by gaps between longitudinally adjacent shield segments.*

*36. An electrical signal transmission cable as in claim 26 further comprising an electrically lossy dissipative material disposed between at least some longitudinally adjacent shield segments.*

*37. An electrical signal transmission cable as in claim 26 wherein variations are provided along said cable length in at least one of: (a) shield segment lengths, (b) shield segment shapes, (c) shield segment thicknesses, (d) gap dimensions between shield segments, (e) gap shapes between shield segments, and (f) gap orientations between shield segments.*

*38. An electrical signal transmission cable as in claim 26 wherein:*

*said plurality of shield segments are divided into at least electrically isolated first and second groups of electrically isolated shield segments; and*

*said second group being spaced radially outwardly from said first group and longitudinally interleaved with said first group to provide shield segments of the second group overlapping gaps between shield segments of the first group.*

*39. An electrical signal transmission cable as in claim 26 wherein at least some of said shield segments are wrapped circumferentially around said at least one differential transmission line with longitudinally extending overlapped edges.*

*40. An electrical signal transmission cable as in claim 39 wherein said overlapped edges are in electrical contact to provide circumferentially continuous electrical conductivity within a respectively corresponding shield segment.*

*41. An electrical signal transmission cable as in claim 26 wherein at least some of said shield segments are wrapped circumferentially around said at least one differential transmission line with longitudinally abutting edges.*

*42. An electrical signal transmission cable as in claim 41 wherein said longitudinally abutting edges are in electrical contact to provide circumferentially continuous electrical conductivity within a respectively corresponding shield segment.*

*43. An electrical signal transmission cable as in claim 26 wherein said plurality of shield segments establish an irregular pattern of segments to assist in reduction of interference including alien crosstalk.*

*44. An electrical signal transmission cable as in claim 26 wherein said plurality of shield segments provide a combination of small sizes and irregular shapes of shield segments to offset tendencies for resonant frequencies and/or to reduce cross-talk.*

*45. An electrical signal transmission cable as in claim 26 further comprising an insulating material interposed between adjacent edges of separate ones of said plurality of conductive shield segments.*

*46. An electrical signal transmission cable as in claim 26 wherein at least some of said plurality of shield segments contain radially oriented corrugations to aid in bending the transmission cable.*

*47. An electrical signal transmission cable as in claim 46 wherein said radially oriented corrugations are diagonally oriented with respect to the longitudinal length of said cable.*

*48. An electrical signal transmission cable comprising:*

*at least one twisted wire pair differential transmission line extending longitudinally along a length of cable; and*

*a plurality of electrically isolated conductive shield segments extending longitudinally along respectively corresponding portions of said cable length in proximity to both wires of said at least one twisted wire pair for at least a substantial portion of one twist period sufficient to effect, while in use carrying electrical communication signals there-along:*

*(a) substantial electrostatic coupling to each wire of said at least one twisted wire pair thereby tending to average together positive and negative electrostatic near-field emissions from the at least one twisted wire pair, and*

*(b) substantial magnetic coupling via eddy currents to each wire of said at least one twisted wire pair thereby tending to average together oppositely directed magnetic field emissions from the at least one twisted wire pair.*

*49. An electrical signal transmission cable as in claim 48 wherein said shield segments also extend circumferentially completely around said at least one twisted wire pair.*

*50. An electrical signal transmission cable as in claim 48 wherein variations are provided along said cable length in at least one of: (a) shield segment lengths, (b) shield segment shapes, (c) shield segment thicknesses, (d) gap dimensions between shield segments, (e) gap shapes between shield segments, and (f) gap orientations between shield segments.*

*51. An electrical signal transmission cable comprising:*

*at least one differential transmission line having a pair of insulated wire conductors extending along a longitudinal direction of cable length; and*

*a plurality of electrically isolated conductive shield segments extending longitudinally along respectively corresponding portions of said cable length in proximity to both wires of at least one said differential transmission line sufficient to effect, while in use carrying electrical communication signals there-along:*

*(a) substantial electrostatic coupling to each wire thereby tending to average together positive and negative electrostatic near-field emissions from the at least one differential transmission line, and*

*(b) substantial magnetic coupling via eddy currents to each wire thereby tending to average together oppositely directed magnetic field emissions from the at least one differential transmission line.*

*52. An electrical signal transmission cable as in claim 51 wherein said shield segments also extend circumferentially around said at least one differential transmission line.*

*53. An electrical signal transmission cable as in claim 51 wherein variations are provided along said cable length in at least one of: (a) shield segment lengths, (b) shield segment shapes, (c) shield segment thicknesses, (d) gap dimensions between shield segments, (e) gap shapes between shield segments, and (f) gap orientations between shield segments.*

* * * * *